US011847300B2

(12) United States Patent
Yurasits

(10) Patent No.: US 11,847,300 B2
(45) Date of Patent: Dec. 19, 2023

(54) ELECTRONIC INFORMATION HIERARCHY

(75) Inventor: Bryan Yurasits, Levittown, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 246 days.

(21) Appl. No.: 13/417,492

(22) Filed: Mar. 12, 2012

(65) Prior Publication Data

US 2013/0238994 A1    Sep. 12, 2013

(51) Int. Cl.
*G06F 3/00* (2006.01)
*G06F 3/0482* (2013.01)
*G06F 16/957* (2019.01)

(52) U.S. Cl.
CPC ........ *G06F 3/0482* (2013.01); *G06F 16/9577* (2019.01)

(58) Field of Classification Search
CPC ... G06F 3/0482; G06F 3/0485; G06F 16/9577
USPC ................................. 715/716, 713
See application file for complete search history.

(56) References Cited

U.S. PATENT DOCUMENTS

| | | | | |
|---|---|---|---|---|
| 5,835,092 A * | 11/1998 | Boudreau | ............. | G06F 16/957 715/808 |
| 6,031,989 A * | 2/2000 | Cordell | ............... | G06F 17/2229 707/E17.121 |
| 6,496,204 B1 * | 12/2002 | Nakamura | ............ | G06F 3/0481 715/781 |
| 6,772,433 B1 * | 8/2004 | LaJoie | ............... | H04N 5/44513 348/E5.102 |
| 6,857,128 B1 * | 2/2005 | Borden, IV | ........ | H04N 21/4821 715/767 |
| 7,197,759 B2 * | 3/2007 | Barrett | ............... | H04N 5/44543 348/E5.105 |
| 7,363,593 B1 * | 4/2008 | Loyens | ................... | G06F 16/26 715/853 |
| 7,404,152 B2 * | 7/2008 | Zinn | ..................... | G06F 3/0485 715/786 |
| 7,665,109 B2 * | 2/2010 | Matthews et al. | .............. | 725/51 |
| 7,689,928 B1 * | 3/2010 | Gilra | ................... | G06F 3/04855 715/786 |
| 7,693,912 B2 * | 4/2010 | Rose | .................... | G06F 16/9566 707/786 |
| 7,840,979 B2 * | 11/2010 | Poling, Jr. | ............ | G06F 3/0482 725/86 |
| 8,112,718 B2 * | 2/2012 | Nezu | .................... | G11B 19/025 715/716 |
| 8,201,104 B2 * | 6/2012 | Yamamoto et al. | .......... | 715/835 |
| 8,473,868 B1 * | 6/2013 | Kauffman | ............. | G06F 3/0482 715/810 |
| 8,788,964 B2 * | 7/2014 | Shin | .................... | G06F 3/04817 715/784 |
| 8,893,036 B1 * | 11/2014 | Wabyick | ............... | G06F 3/0485 715/786 |
| 9,030,419 B1 * | 5/2015 | Freed | .................... | G06F 3/0416 345/173 |
| 9,063,645 B1 * | 6/2015 | Jitkoff | ................... | G06F 3/0482 |
| 9,582,175 B2 * | 2/2017 | Miyazaki | ............ | G06F 3/04842 |
| 2003/0202019 A1 * | 10/2003 | Detweiler | ............. | G06F 3/0482 715/853 |

(Continued)

*Primary Examiner* — Kieu D Vu
*Assistant Examiner* — Andrew Chung
(74) *Attorney, Agent, or Firm* — Banner & Witcoff, Ltd.

(57) ABSTRACT

Aspects of the disclosure relate to systems and methods for providing and displaying a hierarchy of selectable data items.

27 Claims, 15 Drawing Sheets

(56) References Cited

U.S. PATENT DOCUMENTS

| | | | |
|---|---|---|---|
| 2005/0015742 A1* | 1/2005 | Wood | G06Q 10/06 717/101 |
| 2005/0044577 A1* | 2/2005 | Jerding | H04N 5/44543 725/135 |
| 2005/0134578 A1* | 6/2005 | Chambers | G06F 3/0486 345/184 |
| 2005/0198582 A1* | 9/2005 | Hennum | G06F 3/04842 715/772 |
| 2006/0053470 A1* | 3/2006 | Colter et al. | 725/135 |
| 2006/0059436 A1* | 3/2006 | Nurmi | G06F 3/04855 715/786 |
| 2006/0059441 A1* | 3/2006 | Todd | G06F 3/0482 715/853 |
| 2006/0085764 A1* | 4/2006 | Klementiev | G06F 3/0482 715/853 |
| 2006/0123360 A1* | 6/2006 | Anwar | G06F 3/0482 715/810 |
| 2006/0200443 A1* | 9/2006 | Kahn | G06F 17/3089 |
| 2006/0236261 A1* | 10/2006 | Forstall | G06F 3/0485 715/784 |
| 2006/0253459 A1* | 11/2006 | Kahn | G06F 17/30893 |
| 2006/0253782 A1* | 11/2006 | Stark et al. | 715/727 |
| 2006/0259859 A1* | 11/2006 | Ivarsoy | G06F 16/9577 715/209 |
| 2006/0259925 A1* | 11/2006 | Lemmons | H04N 5/44543 725/39 |
| 2006/0277490 A1* | 12/2006 | Sauermann | G06F 3/0485 715/787 |
| 2007/0162437 A1* | 7/2007 | Hwang | 707/4 |
| 2007/0186183 A1* | 8/2007 | Hudson, Jr. | G06F 3/0482 715/810 |
| 2007/0266411 A1* | 11/2007 | Yamamoto | A63F 13/10 725/88 |
| 2008/0059896 A1* | 3/2008 | Anderson | G06F 3/0481 715/764 |
| 2008/0154958 A1* | 6/2008 | Sloo et al. | 707/104.1 |
| 2008/0300958 A1* | 12/2008 | Gluck | G06Q 30/02 705/7.33 |
| 2008/0313574 A1* | 12/2008 | Aravamudan | G06F 16/957 715/854 |
| 2009/0063517 A1* | 3/2009 | Wright | G06F 16/54 |
| 2009/0150822 A1* | 6/2009 | Miller | G06F 3/0485 715/784 |
| 2009/0183076 A1* | 7/2009 | Shim | G06F 3/0482 715/716 |
| 2009/0249203 A1* | 10/2009 | Tsuruta | G06F 3/018 715/702 |
| 2009/0249399 A1* | 10/2009 | Schlarb | G06F 3/0485 725/43 |
| 2009/0259975 A1* | 10/2009 | Asai | G06F 3/04815 715/850 |
| 2009/0282360 A1* | 11/2009 | Park | G06F 3/0482 715/786 |
| 2010/0017872 A1* | 1/2010 | Goertz | G06F 3/018 726/16 |
| 2010/0039400 A1* | 2/2010 | Jang | G06F 3/0488 345/173 |
| 2010/0088641 A1* | 4/2010 | Choi | G06F 3/04883 345/173 |
| 2010/0231612 A1* | 9/2010 | Chaudhri | G06F 3/0485 345/684 |
| 2010/0251165 A1* | 9/2010 | Williams | G06F 3/0482 715/784 |
| 2010/0333014 A1* | 12/2010 | Fritzley | G06F 3/0482 715/784 |
| 2011/0010672 A1* | 1/2011 | Hope | G06F 3/04817 715/841 |
| 2011/0016391 A1* | 1/2011 | Borovsky | G06F 3/0482 715/702 |
| 2011/0016428 A1* | 1/2011 | Lupton, III | G06F 3/0362 715/830 |
| 2011/0022310 A1* | 1/2011 | Ishii | B60R 11/0258 701/532 |
| 2011/0055752 A1* | 3/2011 | Rubinstein | G06F 3/0485 715/784 |
| 2011/0072363 A1* | 3/2011 | Mandel | G06Q 10/107 715/752 |
| 2011/0099522 A1* | 4/2011 | Kim et al. | 715/830 |
| 2011/0122159 A1* | 5/2011 | Bergsten | G06F 3/0482 345/684 |
| 2011/0202837 A1* | 8/2011 | Fong et al. | 715/702 |
| 2011/0202871 A1* | 8/2011 | Bair | G06F 3/04855 715/786 |
| 2011/0202880 A1* | 8/2011 | Kawana | G06F 3/0482 715/830 |
| 2011/0265002 A1* | 10/2011 | Hong | G06F 3/04855 715/702 |
| 2011/0265039 A1* | 10/2011 | Lyon | G06F 3/04883 715/830 |
| 2011/0271234 A1* | 11/2011 | Brugler | G06F 3/0482 715/854 |
| 2011/0289397 A1* | 11/2011 | Eastmond | G06F 3/04883 715/212 |
| 2012/0011466 A1* | 1/2012 | Miyamoto | G06F 3/0485 715/786 |
| 2012/0054673 A1* | 3/2012 | Kim | H04M 1/2747 715/784 |
| 2012/0060103 A1* | 3/2012 | Arasaki | H04L 51/04 715/752 |
| 2012/0089914 A1* | 4/2012 | Holt | G06F 3/0485 715/728 |
| 2012/0166220 A1* | 6/2012 | Baldwin et al. | 705/3 |
| 2012/0185800 A1* | 7/2012 | Hart | G06F 3/04817 715/810 |
| 2012/0194742 A1* | 8/2012 | Barnes et al. | 348/569 |
| 2012/0210220 A1* | 8/2012 | Pendergast | G06F 3/0482 715/716 |
| 2012/0246593 A1* | 9/2012 | Rauenzahn | G06F 3/0485 715/784 |
| 2012/0254794 A1* | 10/2012 | Bocirnea | G16H 40/20 715/809 |
| 2012/0278840 A1* | 11/2012 | Glennon | H04N 21/482 725/56 |
| 2012/0290956 A1* | 11/2012 | Lance | G06Q 10/1093 715/764 |
| 2013/0024803 A1* | 1/2013 | Workman | G06F 17/246 715/781 |
| 2013/0055083 A1* | 2/2013 | Fino | G06F 3/0481 715/716 |
| 2013/0110848 A1* | 5/2013 | Svendsen | G06F 16/435 707/748 |
| 2013/0179783 A1* | 7/2013 | Woods | H04N 21/4222 715/716 |
| 2013/0191777 A1* | 7/2013 | Fukunaga | G06F 1/1616 715/784 |
| 2013/0198682 A1* | 8/2013 | Matas et al. | 715/784 |
| 2013/0254308 A1* | 9/2013 | Rose | H04N 21/4882 709/206 |
| 2014/0006982 A1* | 1/2014 | Wabyick | G06F 17/217 715/763 |
| 2014/0189558 A1* | 7/2014 | Takami | G06F 3/0481 715/767 |
| 2015/0026825 A1* | 1/2015 | Dube | G06F 21/10 726/28 |
| 2015/0169699 A1* | 6/2015 | Gilbert | G06F 3/0482 707/722 |
| 2015/0205473 A1* | 7/2015 | Weber | G06F 3/04842 715/830 |
| 2017/0053325 A1* | 2/2017 | VanDuyn | G06Q 30/0277 |
| 2018/0342028 A1* | 11/2018 | Huber | G06Q 50/26 |

\* cited by examiner

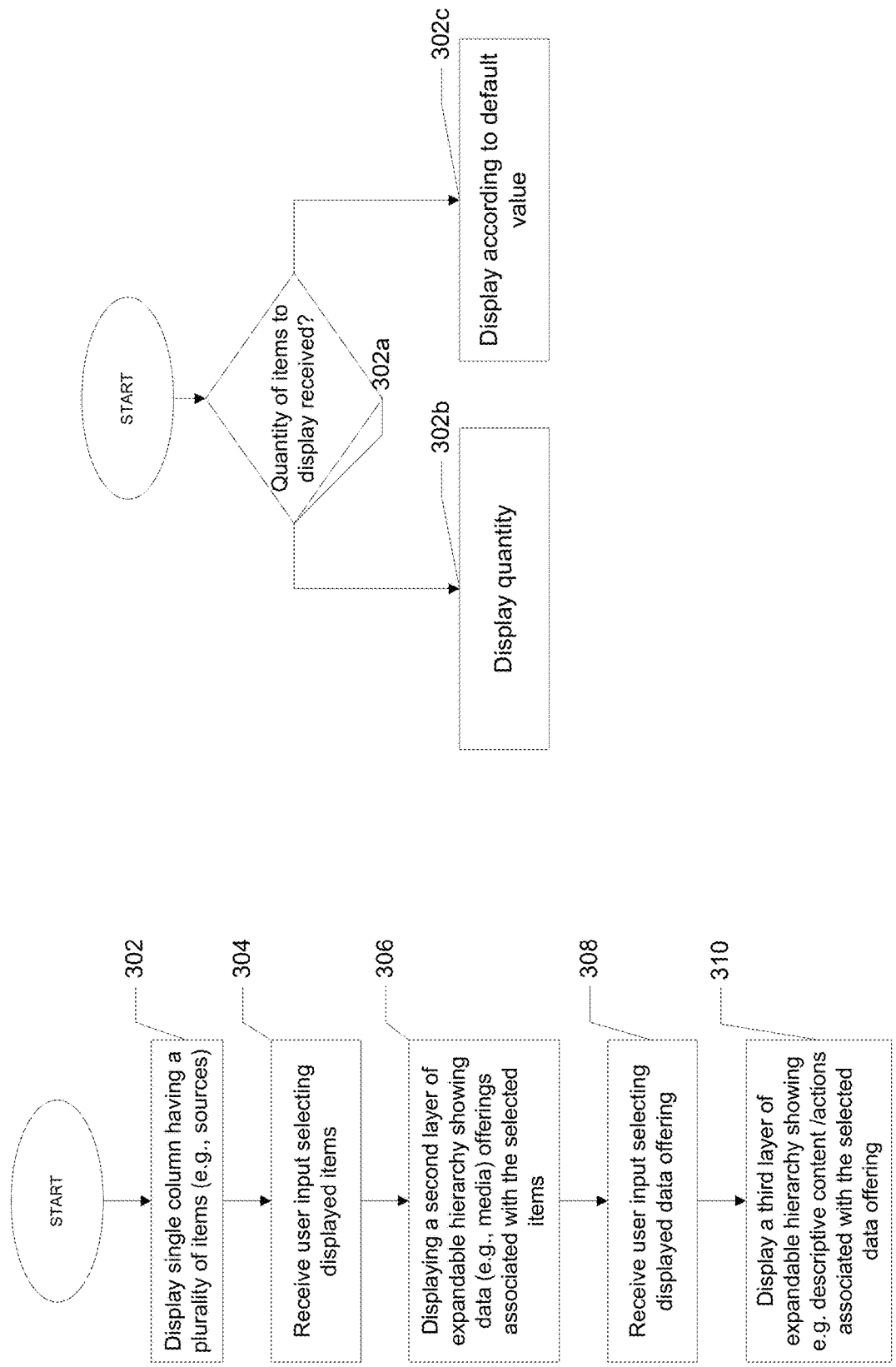

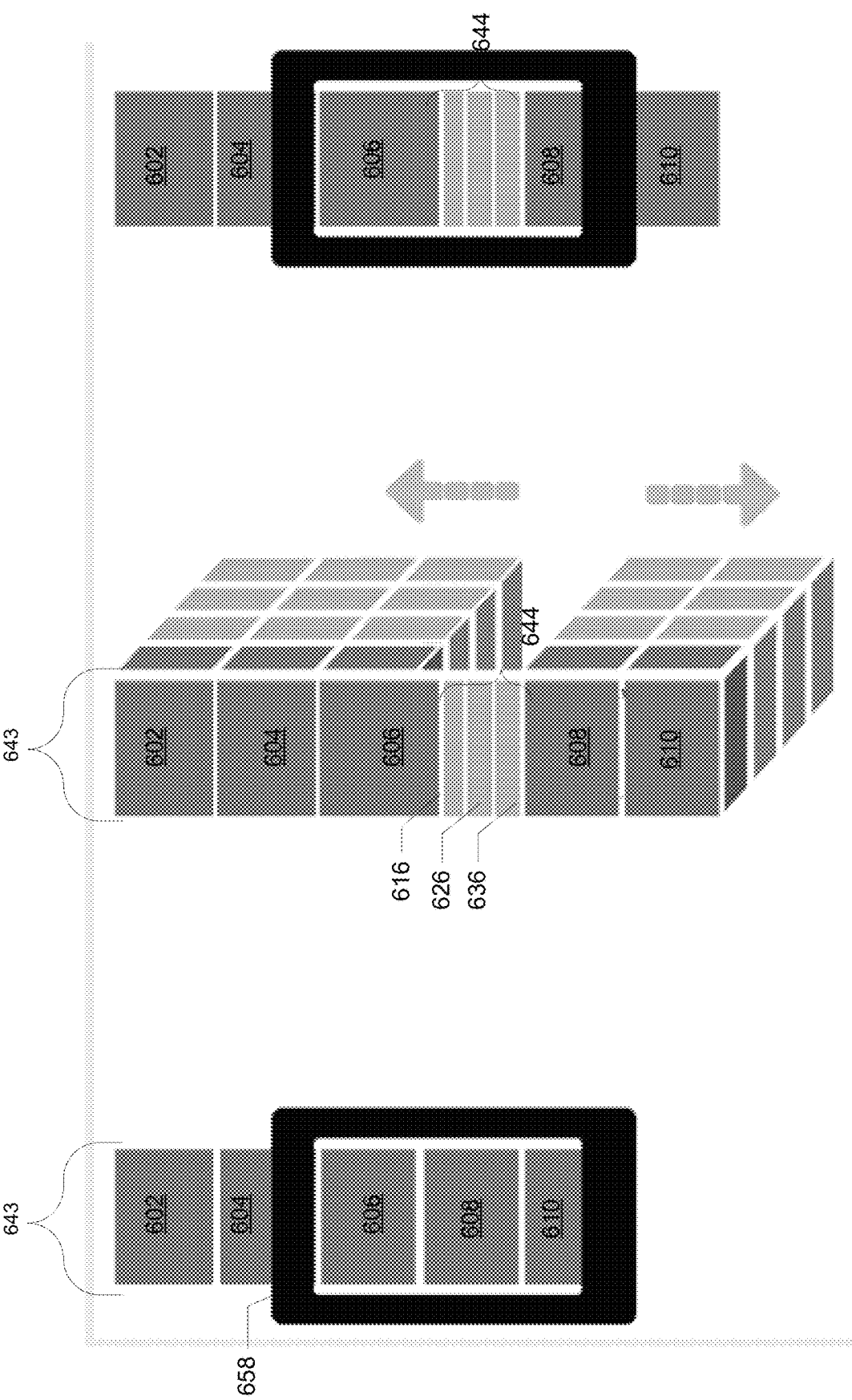

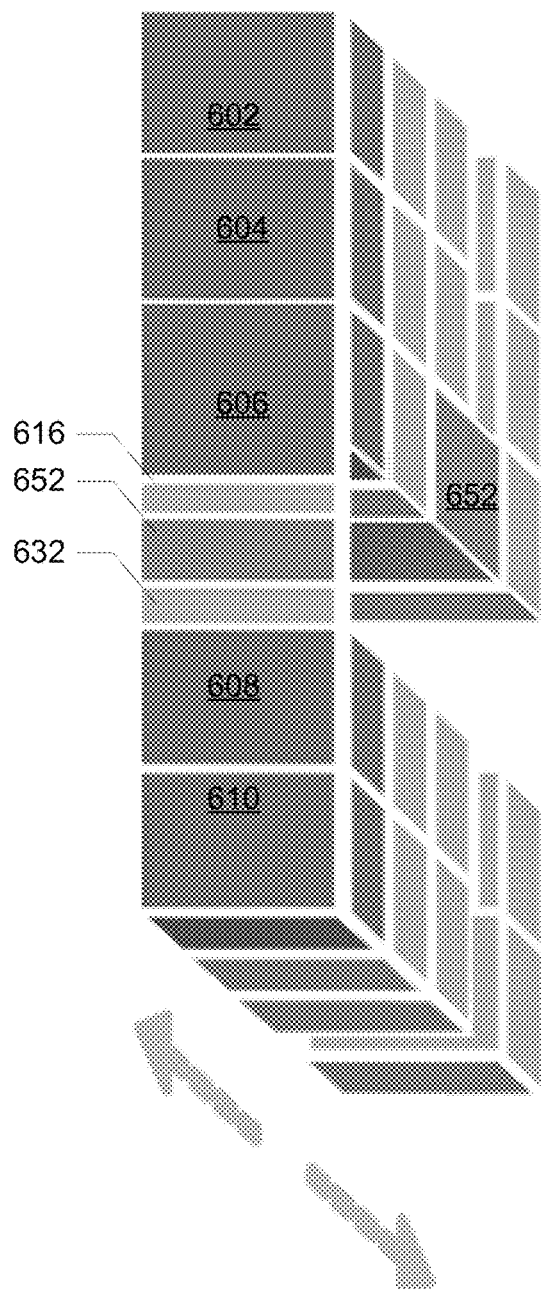
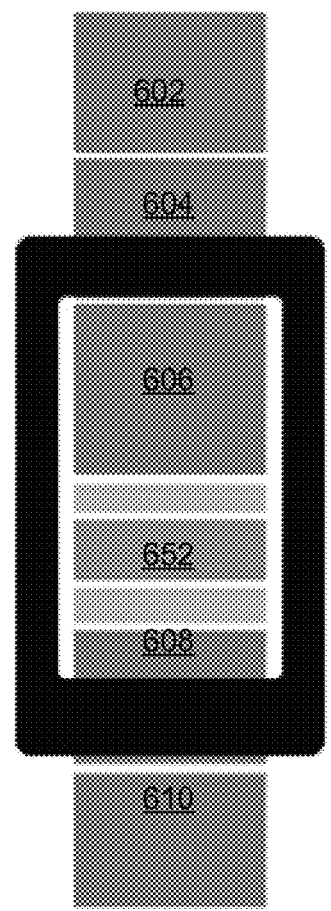
FIG. 6F
FIG. 6G

ELECTRONIC INFORMATION HIERARCHY

BACKGROUND

Recent years have witnessed the development of smart phones and wireless devices that carry data in addition to telephone conversations. Some devices, however, have screens that do not adapt themselves well to displaying certain content (e.g., complex Web pages and/or two dimensional grid guide listings). A user may be forced to constantly zoom in and out to access data, and may become lost or confused due to the small screen area, and data organization, of the portable device Therefore, there is an increasing need for simpler and more appealing ways to search for and access content on display devices.

BRIEF SUMMARY

Aspects of the disclosure relate to systems and methods for providing and/or displaying data in a hierarchy. The hierarchy of data may be configured to display content, available from, for example, various content items. In one embodiment, a system may be configured to display and permit navigation of multidimensional (e.g., time and content item) data on a display device. The display devices may be variously configured to include large and small devices, mobile and fixed devices, and other suitable displays. In certain embodiments, a display device may be in operative communication with a more stationary object. As one example, many home appliances (such as refrigerators) are increasingly being manufactured with one or more display devices. Thus, aspects of the current disclosure may be implemented on any display device and are not restricted to display devices of portable devices.

In another embodiment, a display device may be configured to display a first layer of an expandable hierarchy of data as a single column along a first axis. The axis may be either in a vertical and/or horizontal orientation. The single column may display, for example, a list of media items such as items. For example, channel listings from one or more service providers may be displayed. In some embodiments, the single column may provide a listing of data items from a plurality of different items.

In yet further embodiments, selection of a media item may result in a second layer of the expandable hierarchy of data to be displayed. The second layer may include media offerings associated with the selected media item. The media offerings may be displayed along the first axis (e.g., vertical axis) (in one or more rows) within the column. In certain embodiments, at least two channel listings of the first layer remain displayed along the vertical axis. The quantity of media offerings displayed in response to receiving the user input may be determined or selected by one or more methodologies and may be dependent upon user preferences, screen size, and/or device type. Further, the quantity to be displayed may be specific to a particular type of information being displayed (e.g., group of listings). In one embodiment, the first and the second layer form an accessible item such as a unitary accessible item. Alternatively, the second layer may scroll within an expanded portion of the scroll listing in the first layer.

In accordance with other embodiments, a user input selecting one of the displayed offerings of the second layer may cause the expansion of at least a portion of the second layer. In one embodiment, a third layer may be introduced within the axis (e.g., a vertical axis). In one embodiment, at least a portion of the first, second and third layers may form a single unitary accessible item. In one embodiment, the third layer may include descriptive content of the selected item (e.g., a media item) along the same axis (e.g., vertical axis). The quantity of offerings (e.g., media offerings) displayed in response to receiving the user input may be determined or selected by one or more methodologies. In yet further embodiments, a user input may identify at least a portion of the descriptive content to be displayed in response to the selection of first layer information (e.g., media offerings). Identification of selection of the descriptive content may be specific to first layer information (e.g., media offering or group of media offerings). In still yet further embodiments, a selectable action for initiating playback of the selected media may be made in addition to displaying descriptive content of the selected media offering. Selectable actions may include, but are not limited to, play, rewind, fast forward, and/or stop.

In another embodiment, the single column of the first layer comprises a substantially uniform horizontal width between two vertical boundaries that are parallel with the first vertical axis. In further embodiments, the portion of the first layer content offerings associated with the selected data listing displayed on the second layer in response to the first user input form a column having the same horizontal width as the single column of the first column. In one embodiment, the media content is displayed within the horizontal boundaries formed by the expandable hierarchy.

In one implementation, displaying playback of the selected content (e.g., media offering) may be provided on a display region within the two vertical boundaries of the single column of the first layer. In another embodiment, the portion of media offerings displayed on the second layer in response to a selection of a media item collectively form a top boundary and a bottom boundary separated by a vertical distance that is substantially identical to the media item that was selected by the first user input. In yet other embodiments, playback of the selected media offering may occur on the device but outside (either partially or fully) the boundaries of the single column of the first layer. In still yet another embodiment, playback of the selected media offering may occur on one or more separate devices, e.g., devices such as one or more televisions or other displays.

Other aspects of the disclosure relate to a plurality of layers configured to provide a selectable collection of data (e.g., images, text, etc.) that permits navigation without losing context and/or orientation. In this regard, implementation of certain embodiments may further reduce the quantity of user inputs required to navigate the data. For example, in exemplary embodiments, a user may navigate multiple layers of hierarchical data without losing context as to his/her location in the hierarchy with a single digit (e.g., a thumb). The user can easily move along the first layer, drop to subsequent layers, move along subsequent layers and back out again while at all times not becoming lost in the data. Further, in embodiments that move along a single axis, the user has intuitive access to the data by continuing to scroll by simply swiping the layered data. In one implementation, data may be rendered based upon the capabilities (and/or settings of) the computing device accessing the data.

An accessed collection of data may include multiple forms of data (e.g., textual, image, and/or video). As one example, modern websites are often configured to simultaneously provide multiple media types. Depending on the capabilities, configuration, and/or user settings of a computing device, a website (or portion thereof) may be rendered to be displayable as a single column comprising a plurality of data entries along a first vertical axis. For example, when rendering a website designed for a computer monitor on a phone, rendering the data in an alternate format may be desirable. For example, rather than have related data appear across the entire screen in two dimensions, the data can appear as multiple dimensions arranged along an axis.

In an exemplary embodiment, a two dimensional program guide with video of the selected program in the upper right corner, information about the selected program in the upper left corner, and a two dimensional information grid with time on one axis and channels on a second axis may be rendered along a single axis in accordance with aspects of this invention. For example, the channels may appear in the top layer information and be scrolled through along one axis (e.g., vertical). Selecting a channel may split the displayed channels separating them along the axis and placing second level information (e.g., time and associated program) between them. Selecting a time/associated program may then split the information again along the same axis (e.g., either vertical or horizontal) and bring up third level information in the opened area (e.g., information about the show). Selecting the third level information may bring up fourth level information such as play, record, send, fast forward, rewind between the second level information. The fourth level information may also be displayed full screen.

The items of data displayed along the axis may represent a different type of data from one or more items (such as websites). In still yet another embodiment, one or more filters may be utilized to determine whether an asset should be rendered. Rendering of assets (for example, from a website) may consider associations or commonalities among the assets. For example, different assets may relate to first group (e.g. a first article or media offering among a plurality articles or media offerings). The rendered assets may be arranged within a hierarchy of data having multiple layers.

The expansion of a first layer to display a second layer may be responsive to the receipt of a user input configured to select one of the displayed data items. In one embodiment, the second layer may comprise information regarding media content. For example, in one embodiment, information regarding a video asset may be displayed. The information may include, for example, a caption, description, length, still image, quality information or combinations thereof. In yet another embodiment, a reduced bit rate version of the video asset may be provided. In still yet another embodiment, the video, in its original bit rate, may be displayable. The second layer, as well as one or more subsequent layers, may be displayed along the same first vertical axis as the first layer. For example, the bit rate displayed may be variable based on the device running the application and/or the connection to the device. Where the device is connected via WiFi, a first image quality may display. As the user walks out of the house and switches to 4G, a second image quality may be played. As the user enters his home and transfers a football game to his television, a third image quality may be displayed.

The preceding presents a simplified summary of some aspects in order to provide a basic understanding of some features described in this disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

In accordance with another embodiment related to, for example, content listings, a first user input selecting one of the displayed items along an axis (e.g., channels and/or media content) may result in expanding the first layer. The first layer is multidimensional in that a second, third, fourth, etc., layer of information exists associated with the first layer. Selection of an item in the first layer allows the first layer to be expanded along the axis and have second layer information inserted between the first layer information. The second layer information may appear as a three dimensional scroll wheel, in a box, and/or as a separate window. The second layer information may then be scrolled through without impacting the location in the first layer information. In one exemplary embodiment, pressing a button such as a "home" button, back button, and/or escape button may take a user from a deeper layer up through the hierarchy to a higher layer. Clicking an item, in certain embodiments, may take a user to a sequentially lower layer in the hierarchy. In this manner, for example, the user may have media items listed in the first layer, e.g., NBC, Youtube, Fox, Yahoo, Pandora. In this example, the user may scroll along one axis to select different elements in the first layer (e.g., media items). Once the user has selected an item in the first layer (e.g., NBC), a second layer opens. In embodiments, the second layer may open along a single axis, splitting apart first layer information and inserting second layer information. This allows the user to move vertically up and down layers of information along the same axis by moving aside the first layer information and exposing the second layer information. For example, where second layer information includes program guide listings, the user may then scroll along the same and/or a different axis program guide listings for NBC (in this example). The scroll may be along the same axis, may be three dimensional such as with a wheel or rolodex, and/or may be a single dimensional scroll. In one embodiment, the scroll continues along the same axis to provide a natural and intuitive progression. The user may then select second layer information such as, for example, a program listing. The selection of the second layer information may be variously configured. In one embodiment, selection of second layer information brings up third layer information e.g., in this example options to play, record, watch trailer, e-mail, link, or view additional information about the show. Additional layers such as fourth, fifth, sixth, etc. layers may also be provided. In one example, the third layer may provide information regarding the selected program listing selected from the second layer. In one embodiment, a layer may provide record, play, and/or send options. In certain embodiments, a layer may be provided such that the selected media content may be played within an area along the same axis of the previous layers. In certain embodiments, different layers may expand the axis even further. For example, when a layer is finally reached which is determined to be suitable, the axis may be expanded to include all or substantially all of the screen area. For example, where the show is finally selected to be watched, the opening along the axis may be full screen or substantially full screen.

BRIEF DESCRIPTION OF THE DRAWINGS

The present disclosure is illustrated by way of example and not limited in the accompanying figures in which like reference numerals indicate similar elements and in which:

FIGS. 3A-3B shows an exemplary flowchart illustrative of one method for displaying media information as an expandable hierarchy of data in accordance with an embodiment of this disclosure;

FIGS. 6A-6G show an exemplary conversion of a 2-dimensional collection data into a hierarchical structure comprising navigable layers of data.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
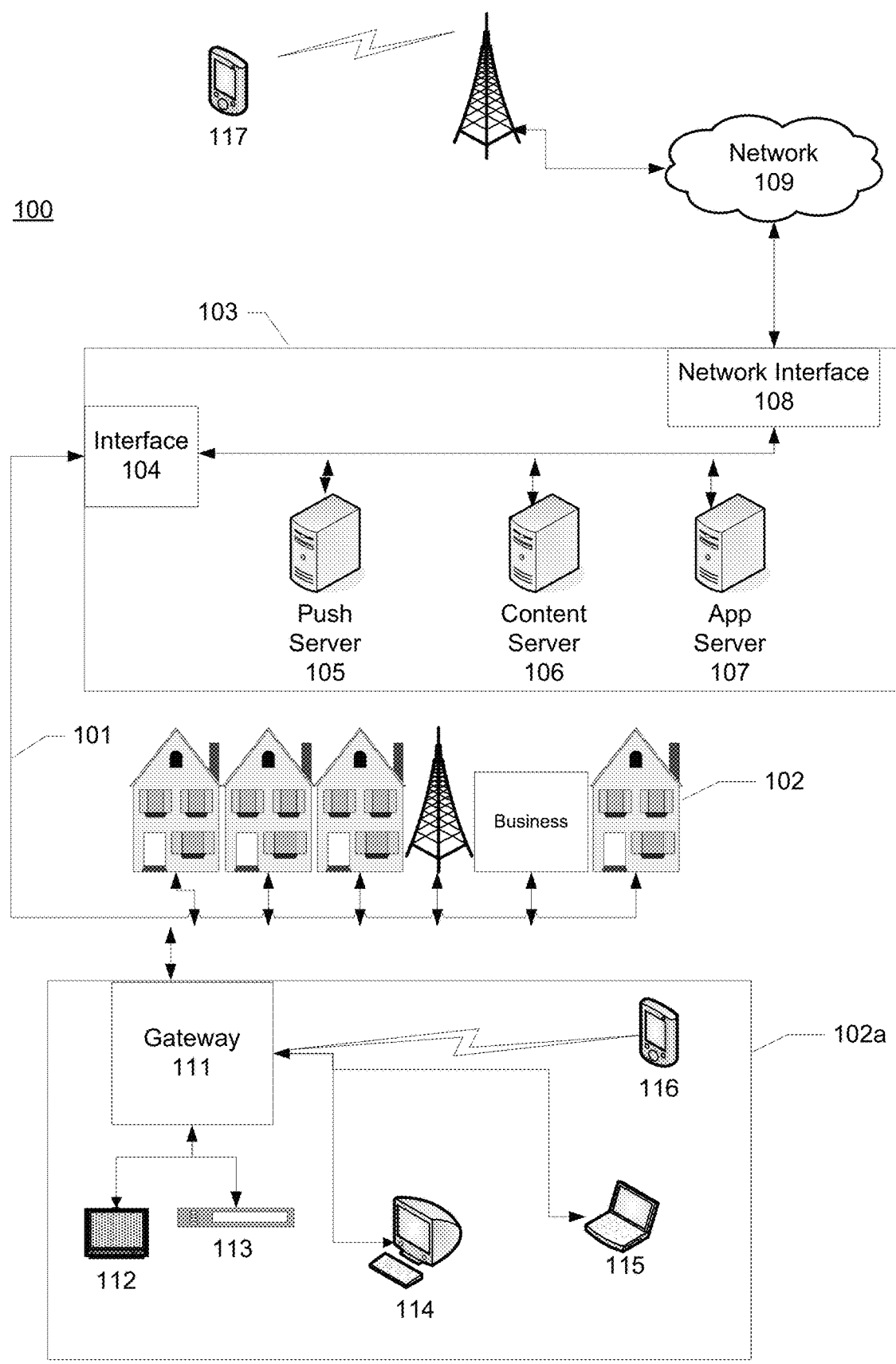
FIG. 1 illustrates an example information distribution network in accordance with an aspect of the disclosure.

FIG. 1 illustrates an example information distribution network 100 on which many of the various features described herein may be implemented. Network 100 may be any type of information distribution network, such as cable, fiber, satellite, telephone, cellular, wireless, etc. One example may be an optical fiber network, a coaxial cable network or a hybrid fiber/coax distribution network. Network 100 may be variously configured such as having one or more wired or wireless communication channels 101 (e.g., coaxial cables, optical fibers, wireless, etc.) to connect one or more locations 102 (e.g., businesses, homes, consumer dwellings, network reitems, etc.) to one or more data center(s) 103 (e.g., data center or headend). The data center 103 may transmit downstream information signals onto the channels 101, and each home 102 may have a receiver used to receive and process those signals.

There may be one line 101 originating from the data center 103, and it may be split a number of times to distribute the signal to various locations 102 in the vicinity (which may be many miles) of the data center 103. The channels 101 may or may not include additional components. Where the communication channels 101 include additional components, these components may be such items such as splitters, filters, amplifiers. Portions of the channels 101 may also be implemented with fiber-optic cable, while other portions may be implemented with coaxial cable, other channels, or wireless communication paths. The data center 103 may include an interface 104 which may be variously configured. In one exemplary embodiment, the interface includes a modulator and a demodulator (modem). The data center 103 may include various backend devices such as processors and/or storage devices such as servers 105-107. The data center 103 may also include one or more network interfaces 108, which can permit the data center 103 to communicate with one or more networks 109 such as public, private, switched, or packet networks. Network(s) 109 may be variously configured to include one or more networks such as for example, the Internet devices, telephone networks, cellular networks, fiber networks, wireless networks (e.g., WiMAX), satellite networks, and any other desired network.

As noted above, the data center 103 may include a variety of servers such as one or more content server(s) 106 for distributing audio, video, and/or data content using one or more protocols. The content may be variously configured to include content such as, for example, video on demand movies, television programs, songs, text listings, etc. The content server 106 may be variously configured to include such items as, for example, software to validate user identities and entitlements, locate and retrieve requested content, encrypt the content, and initiate delivery (e.g., streaming) of the content to the requesting user and/or device.

The data center 103 may also include one or more application servers 107. An application server 107 may be variously configured to offer any desired service, and may run various languages and operating systems (e.g., servlets and JSP pages running on Tomcat/MySQL, OSX, BSD, Ubuntu, Redhat, HTML5, JavaScript, AJAX and COMET).

In one exemplary embodiment, an application server 107 may be configured for a specific environment such as a content distribution and/or monitoring environment. An example location 102*a* may include an interface 110 which may be variously configured such as, for example, including one or more transmitters and/or receivers used to communicate with the data center using, for example channel(s) 101. The interface 110 may be variously configured to communicate directly and/or indirectly with one or more devices local and/or remote to the location 102(a). For example, these devices may include one or more terminals such as, for example, televisions 112, radios, music players, computing devices, a set-top box(es) (STB) 113, computers 114, laptops 115, digital video recorder(s) (DVR), computer server(s), wireless devices such as phones or tablets 116, and/or any other desired computing device. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, etc.

Figure 2:
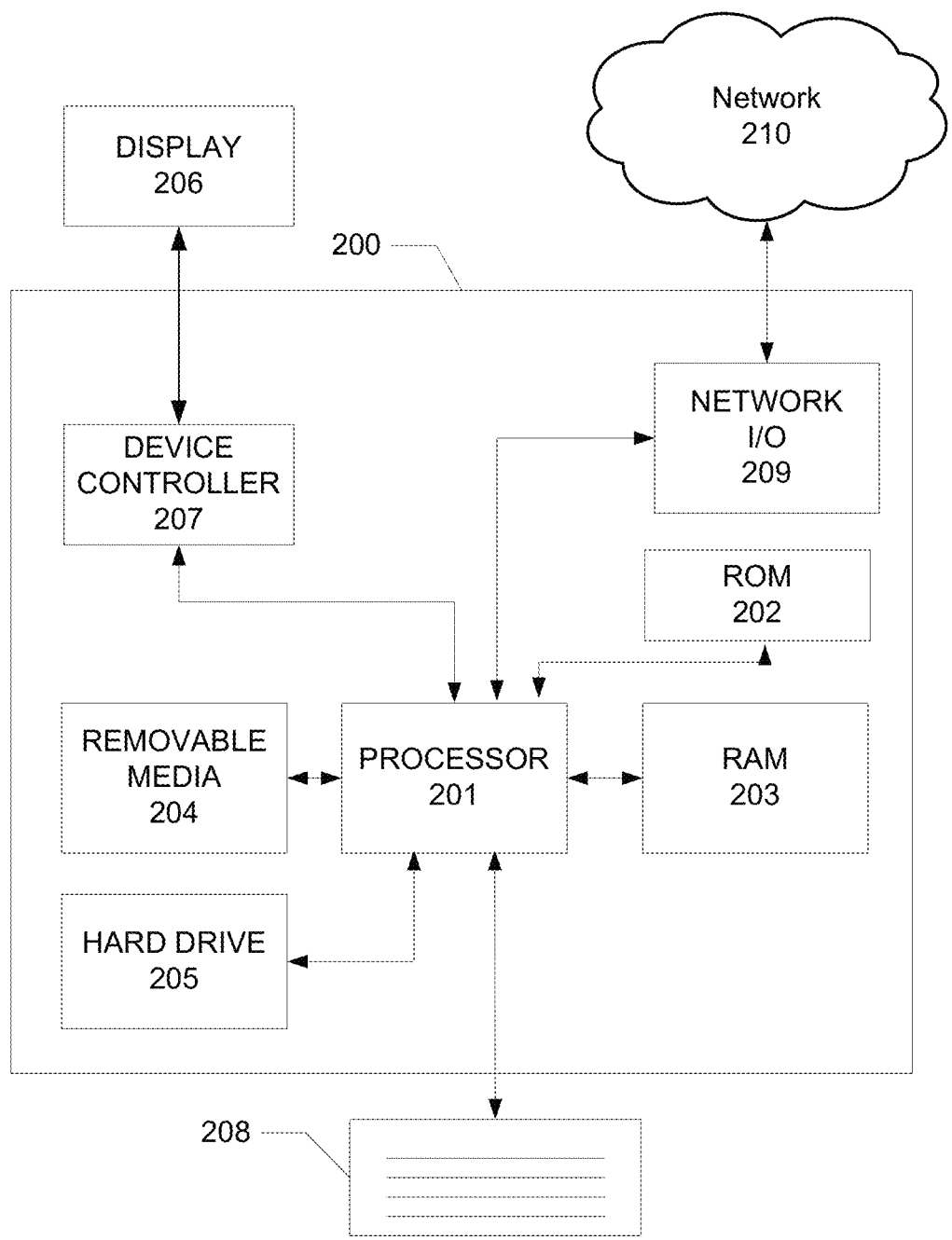
FIG. 2 illustrates exemplary hardware elements on which the various elements described herein may be implemented in accordance with an aspect of the disclosure.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disc (CD) or digital versatile disc (DVD), floppy disk drive, or any other desired electronic storage medium. Instructions may also be stored in an attached (or internal) hard drive 205. The computing device 200 may include one or more output devices, such as a display 206, and may include one or more output device controllers 207, such as a video processor. There may also be one or more user input devices 208, such as a remote control, keyboard, mouse, touch screen, microphone, etc. The computing device 200 may also include one or more network interfaces 209, such as, for example input/output circuits with one or more external network(s) 210. The network interface may be a wired interface, wireless interface, or a combination of the two. In some embodiments, the interface 209 may include a transmitter and/or receiver (e.g., a modem), and network 210 may include one or more of the communication channels 101.

Aspects of this disclosure relate to improved systems and methods for displaying, data, such as media content information on display devices. FIGS. 3A-B are exemplary flowcharts of illustrative method(s) for displaying data as an expandable hierarchy of data in accordance with embodiments of this disclosure. One or more methods of FIGS. 3A-B may be utilized to permit a user of a device, such as a mobile portable device, to consume and/or search data such as descriptive content of media they may be interested in. For example, in step 302 the display may include a column or row with one or more first layer data (e.g., items). In exemplary embodiments, different information may be shown along a single axis such as in a row or column. In one embodiment, HBO, Showtime, and/or Disney may be shown vertically down the screen. The user may navigate down the different items and select a item. A second layer may then arise. The second layer may be disposed adjacent to, overlay, partially overlay, expand out of, and/or in a 3D relationship to the first layer. In one embodiment, the second layer may be disposed along or substantially along a similar axis to the first layer data. The user may provide a further selecting of second layer data (e.g., of an offering of content such as a movie or show). The third selection may variously create a third layer of expandable hierarchy showing further data, e.g., descriptive content and/or actions associated with the selected offerings. A third layer may be disposed adjacent to, overlay, partially overlay, expand out of, and/or in a 3D relationship to the second layer. In an exemplary embodiment, the third layer expands substantially along the same or similar axis which in certain embodiments facilitates the user keeping context of his location within the data. In this example, the third layer data may be, for example, additional information, or options selectable by the user, such as: play, record, and/or send.

The display of the hierarchy either vertically and/or horizontally and/or the relationship between the various layers (disposed adjacent to, overlay, partially overlay, expand out of, and/or in a 3D relationship) may be user selectable. Further, the user may select the content items and/or content within the content items. For example, the user may apply various filters such as, for example, favorite channels, favorite content providers, ratings, and/or other selection criteria to the first, second, or other layers of data. The user may further apply filters to the content within the content items e.g., a rating on the programs available for viewing and/or a category of programs. Further, the filter may be manually controlled and/or automatically adjusted based on the device configuration on which the information is presented. For example, automatic filters and/or configurations may be applied where the device is low resolution (e.g., non-HD TV), small in size (e.g., cell phone), medium in size (e.g., laptop, tablet), or large in size (e.g., television). Additionally, the filters may be stored in the cloud and/or at one or more devices. The filters may be pushed out from one device to all other associated devices, for example, with user the configuration files. For example, in the exemplary flow of FIG. 3B, the filters may be applied based on the size of the display and the filter applied relates to the quantity of the items to be displayed at step 302a. The display quantity may be adjusted at step 302b or set to a default value step 302c where the display is not known.

In one exemplary embodiment, a hierarchy of layers may be configured to provide a selectable collection of data. The collection of data may represent a plurality of data items. In one embodiment, data items may represent content listings of media. To permit easier access to an end user, content listing (or any other type of data) may be rendered in a single column comprising a plurality of data entries along a first axis (e.g., vertical).

Figure 4B:
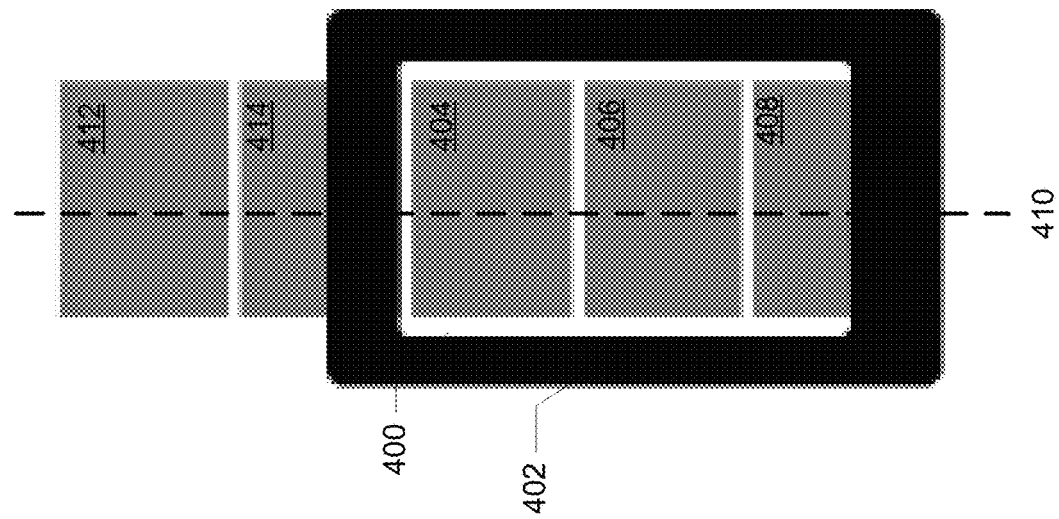
FIGS. 4A-4G show an exemplary hierarchy of layers configured to provide a selectable collection of data being displayed on a display device in accordance with aspects of the disclosure.
Figure 4A:
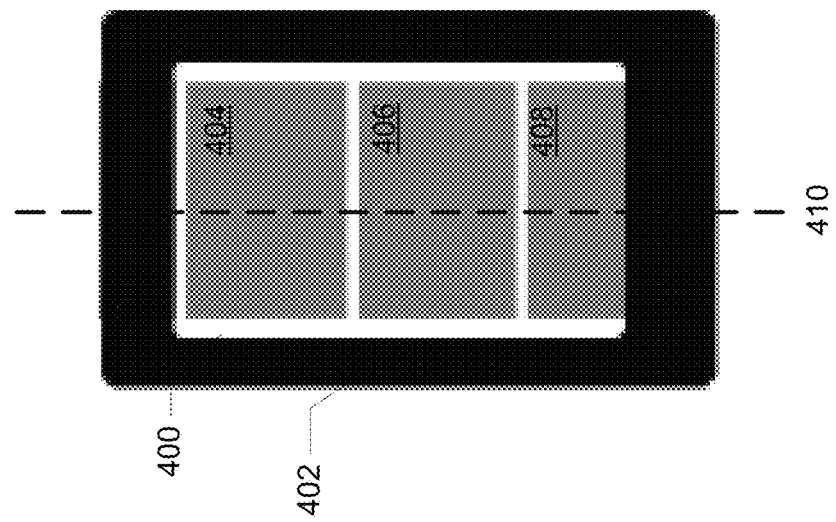

Specifically, FIGS. 4A-4G show an illustrative hierarchy of data, exemplified as selectable data 400 (e.g., content listings), being displayed on display device 402. As seen in FIG. 4A, a selectable hierarchy of data 400 may include a plurality of sequentially-arranged data 404-408 (e.g., items of media content), aligned along vertical and/or horizontally axis 410 of display 402. In one embodiment, data 404-408 may represent items of content, such as media content listings. FIGS. 4A-4D show a rectangular overlay such as might be associated with, for example, a telephone. While embodiments may be employed on any display device, the elongated rectangle associated commonly with phones has particular applicability to certain embodiments particularly where a vertical axis is utilized.

In an embodiment in which data 404-408 represents items of media content, data 404 may represent video reitems available from one or more items, such as a first website and/or content provider (e.g., NBC, CBS, Yahoo, Google, or Amazon), data 406 may represent textual information accessible from the one or more items such as a second web site (e.g., HBO), and data 408 may represent one or more video reitems accessible from a third content provider (e.g., Disney). While the information shown in FIG. 4A may be variously configured, in exemplary embodiments it may represent first level information. There may, of course, be more first level information available than can be displayed on the screen at any one time. FIG. 4B shows that the first level information may be scrolled on and off of the screen and may be considered to exist behind the screen.

In exemplary embodiments, the first, second, and/or third, etc. level information is stored as a linked list. In still further embodiments, the first, second, and/or third, etc. level information is stored in a data array.

Figure 4C:
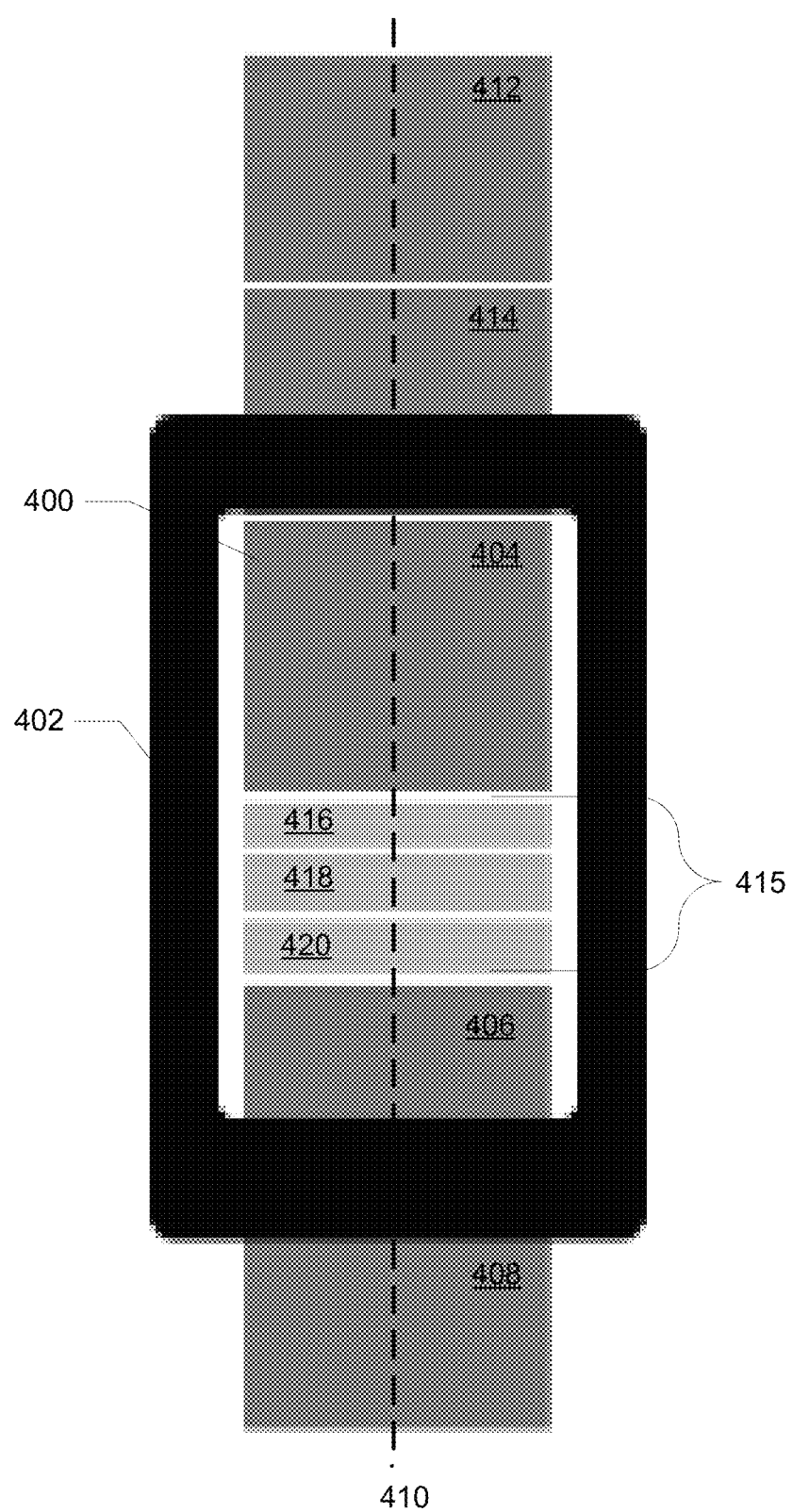
Figure 4D:
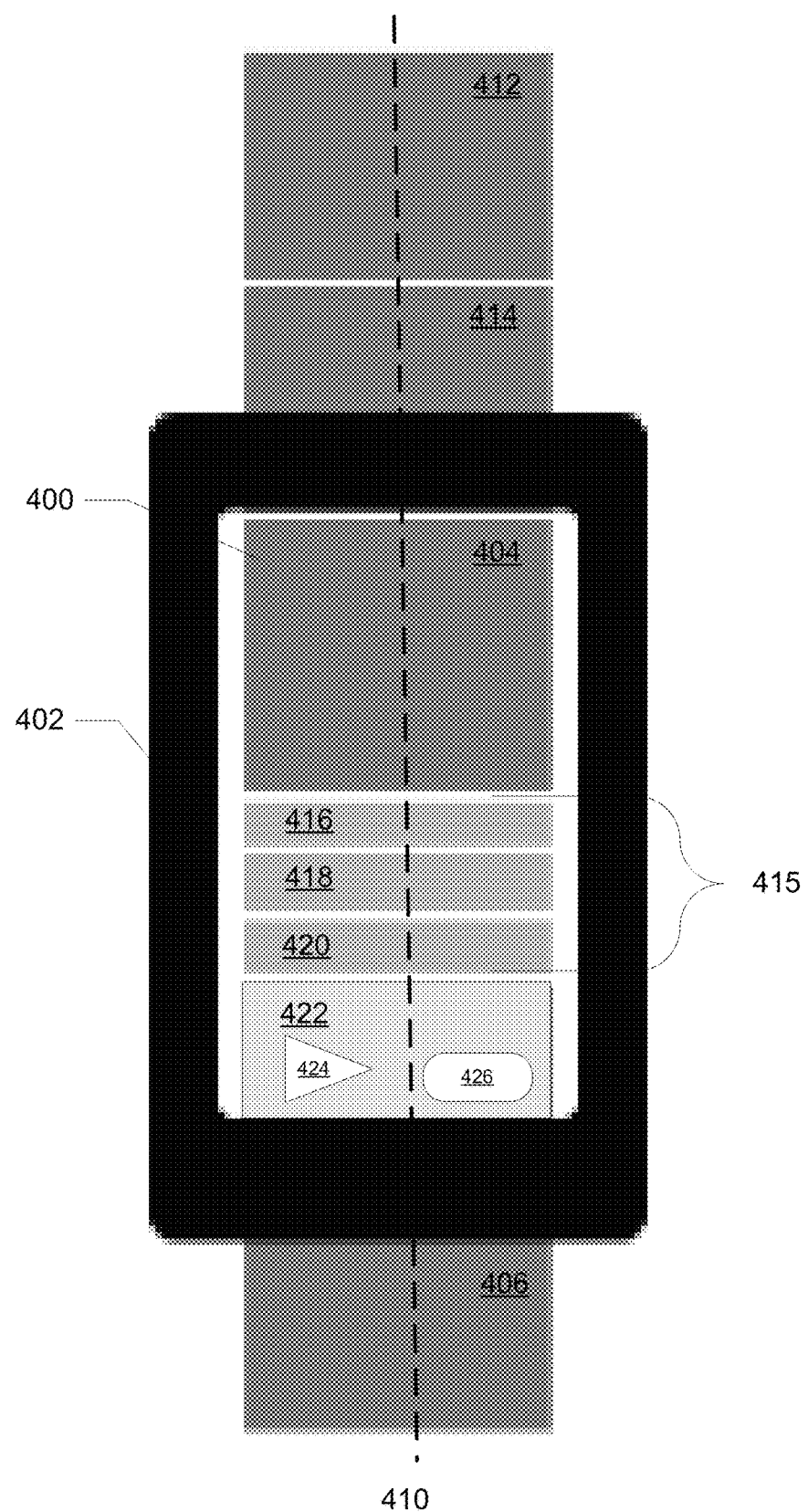
Figure 4E:

In still further embodiments, data 404-408 of FIG. 4A may represent channel listings, such as associated with a program guide. For example, briefly looking to FIG. 4E, item 404 may represent channel 5 ("USA"), item 406 may represent channel 6 ("ABC") and item 408 may represent channel 7 ("ESPN"), each of which may be received from one or more content provider(s). The items of media content 404-408 may be received through any suitable item such as a multicast media system. In yet another embodiment, item 406 may represent a first channel from a first content provider and item 408 may represent a first channel from a second content provider such as a media item. For example, item 404 may represent an high-definition (HD) movie channel from a multicast provider, item 406 may represent a music channel from an over-the-air (OTA) antenna, and item 408 may represent an interactive media channel from a third provider. One or more channels may be mapped to interactive content available from any suitable item such as, for example providers on the Internet and/or a webpage. As shown in the examples of FIG. 4A-4B and 4E, data items 404-408 are shown as sequentially-adjacent along axis 410. This example does not have intervening content which, in certain examples, can simplify the presentation to the user.

In exemplary embodiments, the layer one information represents represent channel listings available from a single content provider, layer two information represents programs on that channel, and subsequent layer information includes the ability to play the content. However, as discussed above, this disclosure is not so limited, and the examples are merely for illustrative purposes.

Various embodiments may determine whether an indication of the quantity of layer information (e.g., 404-408) to be displayed has been received (see, e.g., decision 302a of FIG. 3B). In one embodiment, the quantity of information associated with a particular layer to be displayed at block 302 may be based, at least in part, on the size of the display 400, the type of device 200, the level of information (e.g., layer one, two, three etc.) and/or one or more software/hardware components of device 200. For example, in one embodiment, one or more systems or methods may auto-detect that device 200 is a mobile device (or specific type, make or model of a mobile device) and determine a quantity of first, second level, and/or third level, etc. information to simultaneously display at block 302.

In yet another embodiment, decision 302a may comprise the reception of a user input that indicates the quantity of information items, such as, channel listings to be simultaneously displayed along axis 410. If at decision 302a, an indication is received (either through a user input, an automated procedure, and/or another action), block 302b may be implemented to display the indicated quantity of data items at block 302. If an indication is not received at 302a, block 302c may be received to display a default value of data items. Block 302c may be followed by the re-execution of 302a.

In one implementation, level one information (e.g., data items) 404-408 may be vertically accessible as a single item, such that less than all of the level one information is simultaneously viewable on display 402. As an example, FIG. 4B shows hierarchy of data of selectable level one information 412-414 as part of the single axis of hierarchy of data of selectable content listings only some of which is on the screen. In the depiction shown in FIG. 4B, certain level one information 412-414 may not be displayed due to size restrictions. In one embodiment, however, a user may touch/swipe a region of display 402 corresponding to a command to scroll up/down the column, thereby causing other level 1, 2, 3, etc., information (depending on the current active level) to fall outside of the viewable region of display 402. In addition, level one information (e.g., channel listings) 412-414 may enter the viewable region of display 402 (from the top and/or bottom portion). Those skilled in the art will appreciate that a touch-sensitive display (such as for example, display 402), is only one example of a mechanism configured to receive a user input to vertically and/or horizontally scroll through the hierarchy of data 400 and that a user input may be received through any input device, including for example, keypad 306 shown in FIG. 2.

Further aspects of this disclosure relate to a hierarchy of data having multiple layers arranged in an expandable hierarchy of data, such as along one or more axis such as a horizontal and/or vertical axis 410. For example, each of items 404-408, 412-414 may represent a first layer data that is first displayed at block 302. Each of the first layer data, however, may be associated with second layer data (e.g., chronologically ordered media offerings that are not displayed in FIG. 4B).

In response to the selection of the displayed item, a first layer (or a portion thereof) may be expanded and a second layer may be displayed in regards to the selected first layer data (see, e.g., block 306 of FIG. 3A). For example, as shown in FIG. 4C, first level data 404 may have been selected, and as a result, second layer data 415 (e.g., multiple second level data items 416-420) may be displayed. Thus, in one embodiment, the first layer (e.g., data items 404-408) may be expanded along the vertical axis 410 and second layer 415 of the expandable hierarchy of data is displayed. As shown in the illustrative embodiment of FIG. 4C, second level 415 comprises at least a portion of the media offerings (e.g., 416-420) associated with the selected item 404. In one embodiment, media offerings 416-420 may be chronologically-ordered.

Further, the displayed level information (e.g., media offerings or content listings) 416-420 of the second layer 415 may be displayed along the same first axis 410 (e.g., vertical axis) and wherein at least a portion of two data items (e.g., 404, 406) of the first layer remain displayed along the axis 410. In the exemplary embodiment of FIG. 4C, item 404 remained upon reception of the user input selecting it, however, in another embodiment, a data item, such as item 404 may not be displayed upon selection, but rather may be replaced with contents of the second layer 415.

The displayed media offerings may be chronologically ordered according to a fixed timeline, for example, 416-420 each represent a fixed time frame, such as 30 minutes. Yet in other embodiments, the media offerings may be ordered on a relative scale such as when the shows are scheduled. For example, longer shows may occupy a slightly larger amount of room along the axis and/or be shown as slightly larger (either vertically and/or horizontally). For example, offering 416 may be scheduled to start at 6:00 and have a duration of 30 minutes and offering 418 may be scheduled to start at 6:30 and have a duration of 1 hour. Therefore, in one embodiment, despite offering 418 being twice the duration of offering 416, it may only occupy one entry rather than two 30 minute time slots. In other embodiments, the longer offering may extend only slightly in the vertical and/or horizontal direction such as about 10%, 20%, 30%, 50% of the original listing. In yet another embodiment, the media offerings may not be chronologically ordered, but rather may be displayed in accordance to other criteria, such as viewer requests, a vote, or combinations thereof.

In accordance with one embodiment, the portion of media offerings (e.g., 416-420) displayed on the second layer 415 in response to the first user input collectively form a top boundary and a bottom boundary separated by a vertical distance (such as along axis 410) that is substantially identical to the item 404 that was selected by the first user input. Yet in another embodiment, the vertical distance between a top and bottom boundary of the displayed media offerings may be less than the selected channel listing (e.g., 404). In yet further embodiments, the vertical distance between a top and bottom boundary of the displayed media offerings may be greater than the selected channel listing (e.g., 404).

In one embodiment, upon reception of the user input at block 304, the first layer and the second layer collectively form a single vertically accessible item at block 306. In another embodiment, the single column of the first layer may define a substantially uniform horizontal width between two vertical boundaries that are parallel with the first vertical axis 410. Further, as shown in FIG. 4C, the portion of the chronologically-ordered media offerings (e.g., 416-420) associated with the selected item 404 displayed on the second layer 415 in response to the first user input form a column having substantially the same horizontal width as the single column of the first column.

In one embodiment, a user input may be specific to a single data item. For example, a user may designate that selection of item 404 may result in the displaying of 3 hours of programming, whereas the selection of item 406 may result in the displaying of 4 hours of programming. Alternatively, the selection may be specific to other criteria, in lieu of or in addition to time, such as a quantity of media offerings. For example, selecting item 404 may display 3 media offerings, whereas selecting item 406 displays 4 media offerings.

At block 308, a user input may be received that is configured to select a displayed media offering (such as one of the displayed media offerings 416-420 of the second layer 415), and in response, display descriptive content of the selected media offering, such as along the same first vertical axis 410.

Figure 4F:
Figure 4G:

In one embodiment, selection of a media offering at block 308 may result in the expansion of the second layer 415 along vertical axis 410 and the insertion of third layer 422 (shown in FIG. 4D) of an expandable hierarchy of data to be displayed (see, block 310). As shown in the illustrative embodiment of FIG. 4D, channel listing 404 may have been first selected, thus causing media offerings 416-420 to be expanded. Media offering 420 may have been subsequently displayed, thus causing insertion and display of layer 422. Although, 404, 420, and 422 are shown as being simultaneously displayable on device 402, those skilled in the art with the benefit of this disclosure will appreciate that this is not a requirement. In this regard, the exemplary embodiment of FIG. 4F shows that the selection of media offering 420 has resulted in the display of the third layer 422, therefore, causing media offering 406 to be below the viewable portion of the screen. Further, a user may cause the collapse or removal of a layer (or portion thereof) of the expandable hierarchy of data through the provision of one or more user inputs.

Nonetheless, in one embodiment, upon reception of the user input of 308, the first layer (listings 404-408), the second layer 415, and the third layer 422, collectively form a single vertically accessible item. In yet one embodiment, displaying of the third layer 422 may collapse or remove from viewing portions of the first layer. As further seen in the illustrated embodiment of FIG. 4D, the third layer 422 and one or more of displayed media offerings 416-420 of the second layer 415 are displayed along the same first vertical axis 410. In the exemplary embodiment of FIG. 4D, media offering 420 remained upon reception of the user input selecting it; however, in another embodiment, a selected offering, such as listing 420 may not be displayed upon selection, but rather may be replaced with contents of the third layer 422. In one implementation, displayed descriptive material of layer 422 to replace the selected media offering 420, however, at least one adjacent media offering (e.g., 418) of the second layer 415 along the first vertical axis 410 is retained.

Layer 422 may comprise descriptive content of the selected listing 420. It may comprise summary information, series or episode information, actors, producers, or any other descriptive information. Descriptive content of layer 422 may comprise audio, video, text, or combinations thereof. In certain implementations, one or more user inputs may identify at least a portion of the descriptive content to be displayed in layer 422. In one embodiment, a process similar to that shown in FIG. 3B may be implemented before block 308 to select or determine at least a portion of descriptive content to be displayed in layer 420. In one embodiment, the identification of descriptive content may be specific to channel listing (e.g., 404), media offering (e.g., 420) and/or other criteria.

Block 310 or another process may be implemented to display a selectable action for initiating playback of the selected media offering 420. The selectable action may be displayed in addition to displaying descriptive content of the selected media offering 420. Playback options may comprise regular speed play, record, one or more trick play options, such as fast forward and/or rewind, and/or other options. For example, looking to exemplary layer 422, one or more user-selectable items may be provided for initiating user-selectable actions. In one embodiment, layer 422 (and/or another layer) may comprise icon 424 and/or icon 426. Icons 424, 426 may be soft buttons configured to be interacted with, such as during use of a touchscreen and/or another user input device. In one embodiment, icon 424 may be selectable to initiate playback of media offering 420 and icon 426 may be selectable to pause and/or stop playback of media offering 420. In certain embodiments, one or more icons may be configured to initiate or alter playback of media content related to the corresponding media offering (e.g., media offering 420).

In yet another embodiment, block 308 or another process may further initiate playback of the selected media offering (or content related to the selected media offering—such as a preview) on a display region within the two vertical boundaries of the single column of the first layer. The playback may occur simultaneously with the display of descriptive material in layer 422.

Descriptive content of the third layer 422 displayed responsive to the second user input (e.g., block 308) may comprise a top boundary and a bottom boundary separated by a vertical distance (such as along axis 410) that is substantially identical to the collective plurality of media offerings 416-420 displayed. In yet further embodiments, the vertical distance between a top and bottom boundary of the displayed layer 422 may be greater or less than the displayed media offerings (e.g., 416-420). As discussed above, and further seen in FIG. 4F, third layer 422 may be accessible as a single item with at least a portion of the second layer 415 and items from the first layer, such as channel listing 404.

Further aspects of this disclosure relate to rendering and displaying collections of data. FIG. 5A shows illustrative collection of data 500. Collection of data 500 may comprise multiple forms of data (e.g., textual data, image data, video data, and/or application data). In one embodiment, collection of data 500 may be rendered in a user-friendly manner based upon the capabilities (and/or settings of) computing device 502. For example, collection of data 500 may comprise a layer of data, such as a first layer (see, e.g. data 504-508 forming an exemplary first layer). In one embodiment, collection of data 500 may be rendered to permit easier access and navigability. For example, modern websites are often configured to simultaneously provide multiple forms of media types. Depending on the capabilities, configuration, and/or user settings of a computing device, it may be difficult and impractical to render webpage data uniformly across different devices.

Figure 5B:
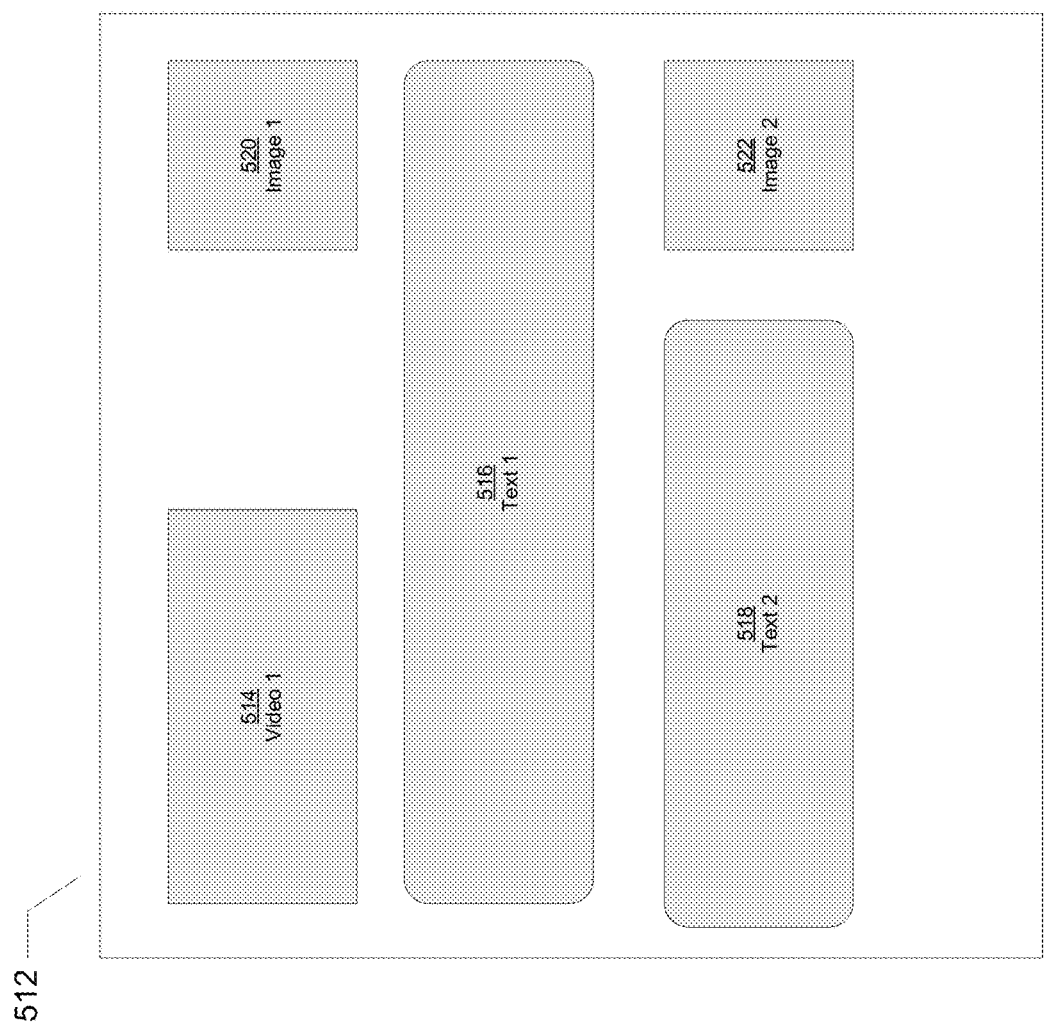
FIGS. 5A-5C show an exemplary hierarchy of layers configured to provide a selectable collection of data being displayed on a display device in accordance with other aspects of the disclosure.
Figure 5A:
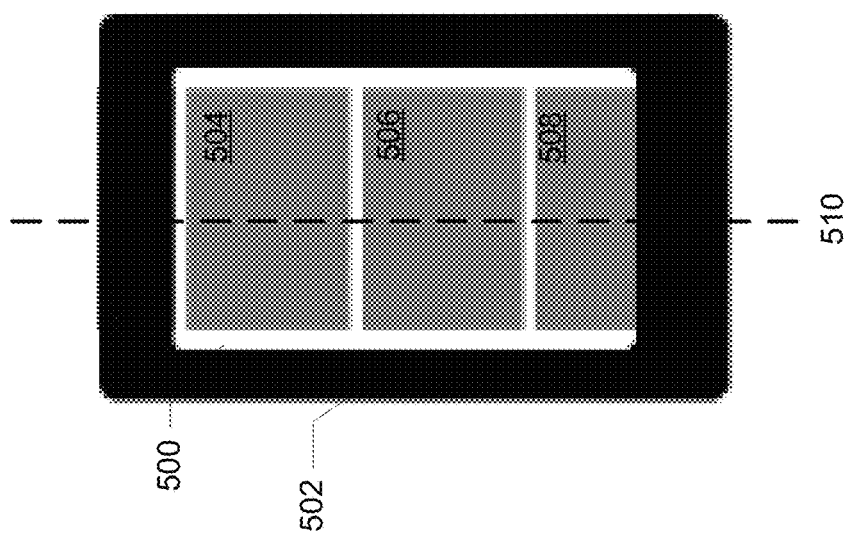

For example, looking to FIG. 5B, exemplary website 512 may include a first video asset 514 (labeled "Video 1"), a first textual asset 516 and a second textual asset 518 (labeled "Text 1" and "Text 2", respectively), and/or a first image asset 520 and a second image asset 522 (labeled "Image 1" and "Image 2", respectively). On a first computing device operating under a first configuration, website 512 may be rendered as shown in FIG. 5B, however, on a second computing device (or on the first computing device under a second configuration), accessing website 512 may force the user to individually zoom into each section and/or lose their location within the site to access a certain portion of the data (e.g., one or more assets 514-522). Thus, in accordance with certain embodiments, website 512 (or a portion thereof) may be rendered to be displayable as a single column comprising a plurality of data entries along a first vertical axis (see, e.g., block 302 of FIG. 3).

As seen in FIG. 5A, selectable collection of data 500 may include a plurality of sequentially-arranged data 504-508, aligned along vertical axis 510 of display 502. In one embodiment, data 504-508 may each represent a different type of data from one or more items (such as websites). In one embodiment, selectable collection of data 500 may comprise sequentially-arranged data 504-508, which are rendered according to data type of assets 514-522 of website 512. Flags or other electronic indicators which may be associated with various assets of webpage 512 may be utilized in the rendering of one or more assets 514-522. In one embodiment, file extensions may be utilized to discern between different data types.

In still yet another embodiment, one or more filters may be utilized to determine whether an asset should be rendered. For example, many websites often have assets that are not undesirable in accordance with certain embodiments. Therefore, based upon one or more determinations, it may be determined to exclude one or more assets from being rendered (or categorized with assets of similar type or characteristics). In one embodiment, location of the asset, its size, file extension, and/or other attributes of an asset or the webpage 512 may be utilized in determining whether to render (or how to render) an asset.

In certain embodiments, the reception of a user input may select which aspects are rendered along the single axis, such as axis 510. In one embodiment, a user may swipe in a direction not parallel with axis 510, such as perpendicular to axis 510, to access filtering information. Upon accessing the filtering information, the user may then be permitted to adjust what information is filtered and/or how information may be filtered. In yet another embodiment, a first layer of information (such as comprising data 504, 506, and 508) may be provided along a first axis, such as axis 510, and reception of a user input will cause another first layer of information to be displayed substantially along the same axis. For example, a first layer of information comprising data 504, 506, and 508 shown in FIG. 5A may be first displayed. In one embodiment, data 504, 506 and 508 may each comprise data in a single category, such as "Comedy" assets. Upon reception of a user input, such as a perpendicular swiping motion, the first layer of "comedy" assets may be replaced with a different first layer of data (that does not comprise data 504, 506, 508). The new first layer of data, which may also be displayed substantially along vertical axis 510 may relate to a different category of assets, such as "Drama" assets. In this regard, a user may have access to multiple different hierarchical structures, each with multiple layers.

In one embodiment, data 504 may represent at least one video asset (e.g., asset 514), data 506 may represent at least one textual asset (e.g., assets 516 and/or 518), and data 508 may represent at least one video asset (e.g., asset 514) from website 512. Yet, in another embodiment, at least one of data 504-508 may represent data accessible from a second item, such as a second website. In this regard, aspects of this disclosure are directed toward aggregating data from multiple items and rendering them in a more user-friendly manner.

The rendering of assets 514-522 may consider associations or commonalities among the assets. For example, video asset 514, textual asset 516, and image asset 520 may relate to a common theme, such as a first media offering (such as a first news story). Thus, in one embodiment, data 504 may represent an aggregation of data that includes assets 514, 516 and 520. Likewise, textual asset 518 and image asset 522 may relate to a second media asset, therefore, data 506 may represent the collection of assets 518 and 520. In one implementation, the column of first layer data 504-508 shown in FIG. 5A may be vertically accessible as a single item, for example, as described above in reference to FIG. 5B.

The rendered assets may be arranged within a hierarchy of data having multiple layers, such as along vertical axis 510. For example, the illustrative collection of data shown as elements 504-508 may represent a first layer (as shown in FIG. 5A). In one embodiment, data items 504-508 may first be displayed at block 302 of FIG. 3. The first layer (or a portion thereof) may be expanded and a second layer may be displayed in regards to the selected item (see, e.g., block 306 of FIG. 4A). The expansion of the first layer may be responsive to the receipt of a user input configured to select one of the first layer data elements 504-508. For example, as discussed above, video asset 514, textual asset 516, and image asset 520 may relate to a common theme, such as a first news story. Thus, in one embodiment, data 504 may represent the collection of assets 514, 516 and 520. Looking to FIG. 5C, selection of item 504 may cause layer 524 to be displayed. Thus, in one embodiment, the first layer (e.g., data items 504-508) may be expanded along the vertical axis 510 and second layer 524 of the expandable hierarchy of data is displayed.

The second layer 524 may comprise at least a portion of the assets (e.g., assets 514, 516, 520 shown in FIG. 5B) associated with the selected first layer data, such as data 504. In one embodiment, data 526 may comprise information regarding video asset 514, such as for example, a caption, description, length, still image, quality or combinations thereof. In yet another embodiment, a reduced bit rate version of video asset 514 may be provided. Data 528 may comprise information regarding textual asset 516, such as for example, the first portion or introduction located within the asset, an abstract, or any other descriptive materials. In one embodiment, data 528 may provide the entirety of asset 518. Data 530 may comprise information relating to image asset 520, including for example, a caption, description, size, quality, combinations thereof. In one embodiment, data 530 may comprise asset 520, either in its original form or at a reduced size and/or quality. As discussed above, first layer data 504-508 may be differentiated according to other factors, including for example, media types, therefore, the above description, is merely for explanatory purposes, and not for limiting the scope of this disclosure.

Figure 5C:
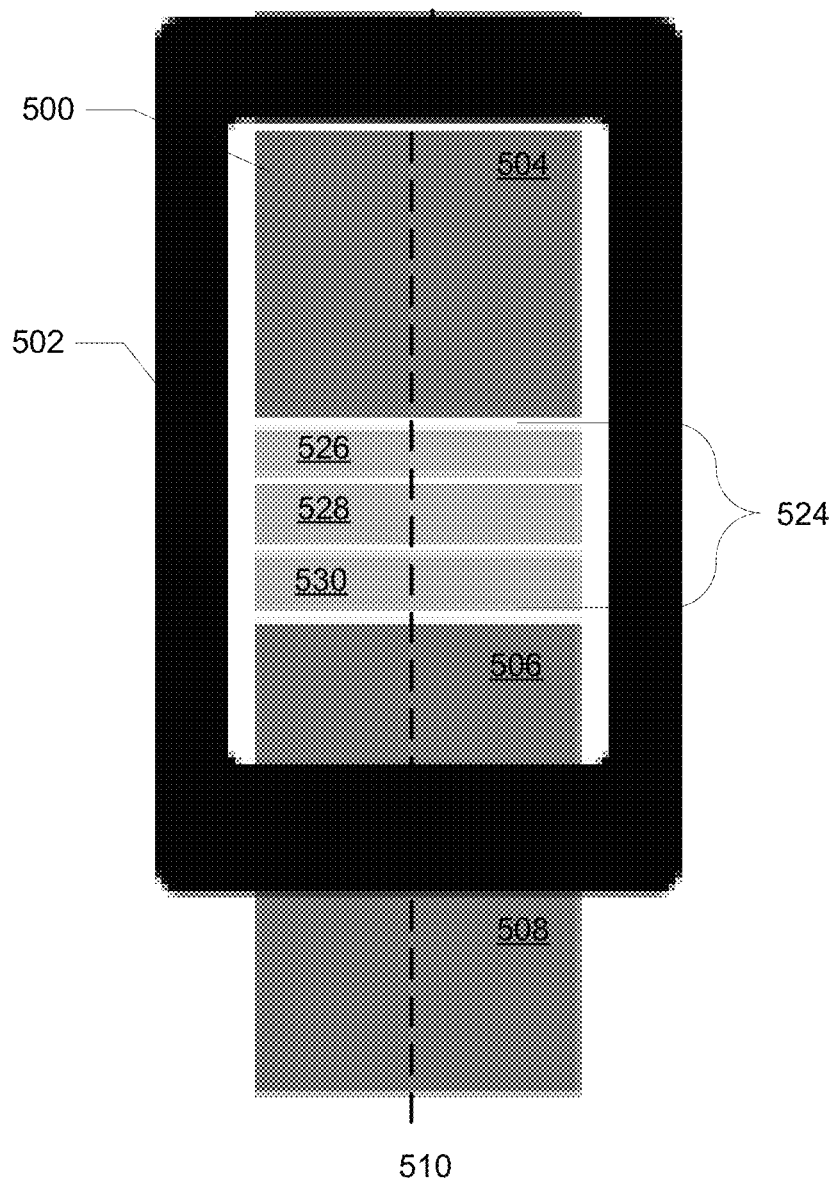

As shown in FIG. 5C, the displayed data 526-530 of the second layer 524 may be displayed along the same first vertical axis 510. In one embodiment, at least a portion of two data elements of the first layer (e.g., 504, 506) may remain displayed along the vertical axis 510. In the exemplary embodiment of FIG. 5C, data 504 remained displayed upon reception of the user input selecting it, however, in another embodiment, a selected first layer data element, such as data 504 may not be displayed upon selection of one or more of first layer data elements 504-508, but rather may be replaced with contents of the second layer 524. As discussed above in relation to FIG. 5D, further layers may be expanded along the same vertical axis, such as axis 510.

In yet further embodiments, icons may appear as part of the level 1, 2, 3, etc., information either alone and/or along with textual and/or video information. For example, a fast forward, rewind, pause, and play video control icon bar may be inserted in, for example, a single axis program guide. In one exemplary embodiment, the lower level data (e.g., third level data) includes a video control icon bar along with video of the selected program.

Figure 6A:
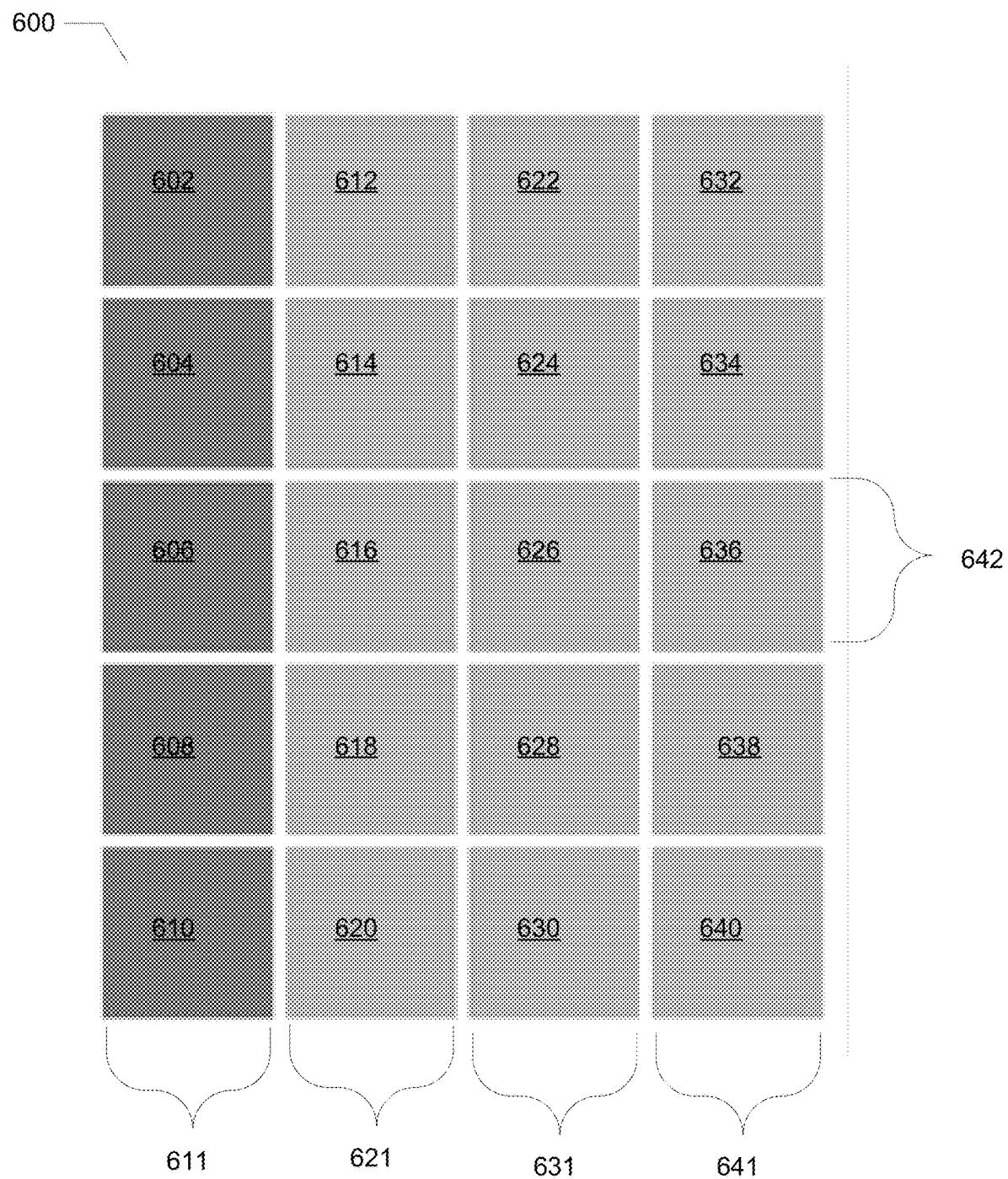

Further aspects of this disclosure relate to creating, converting and/or modifying a 2-dimensional structure (or information within the structure) into a navigable hierarchical structure. FIG. 6A a shows an exemplary visual depiction of a 2-dimensional structure of data (see structure 600). Although structure 600 is shown as a visually depicted 2-dimensional table, in certain embodiments, structure 600 may be a logical data structure absent any visual depiction. In one embodiment, structure 600 may comprise media information, such as elements of an electronic program guide (EPG). For example, structure 600 may comprise a plurality of data items. The data items may comprise items of media content, such as items 602-610 (shown arranged in column 611). Items 602-610 may be received through any suitable network(s), including for example, a multicast media system. In one embodiment, item 602 may represent the first channel from a first content provider and item 604 may represent the first channel of a second content provider. In further embodiments, one or more items 602-610 may represent an interactive media channel from one more providers. One more channels may be mapped to interactive content available from any suitable item such as, for example, provided through the Internet and/or a webpage.

Each of the items 602-610 may be associated with one or more groups of related information, such as media offerings. For example, media offerings 612-620 may represent content from items 602-610 respectively. In one embodiment, media offerings 612-620 (arranged as column 621) may be available during a first time period, such as during a 30 minute segment, and media offerings 622-630 (column 631) may be available during a second time period. Similarly, offerings 632-640 (column 641) may be available during a third time period. In other embodiments, there may not be any associated time period that restricts access to one or more of the media offerings within content listings. For example, each of media offerings 612, 622, and 632 may each be available simultaneously. Regardless of whether any timing restrictions are present, items 602-610 are shown as being associated with corresponding media offerings. For example, as shown in FIG. 6A data item 606 is associated with media offerings 616, 626, and 636 (row 642).

Figure 6B:
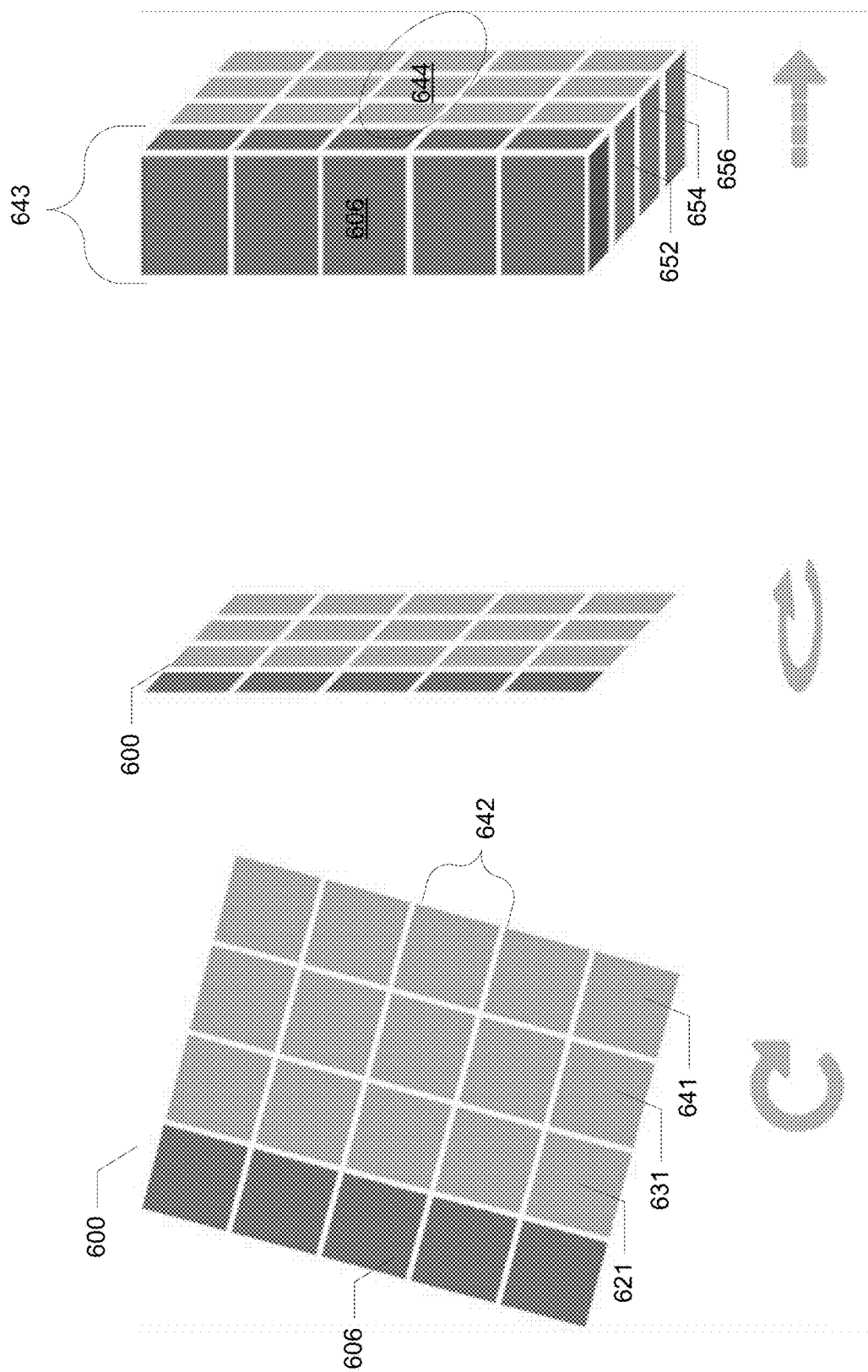

FIG. 6B shows a graphical depiction of an exemplary conversion of structure 600 (or a portion thereof) from a 2-dimensional structure to an expandable hierarchical arrangement. In certain embodiments, the conversion may comprise the creation of a visual hierarchical structure. In further embodiments, an existing visual depiction of structure 600 may be converted and/or modified to form the hierarchical structure. In one embodiment, principles relating to oblique projection may be utilized to display data structures. Oblique projection and/or other techniques may be utilized to display data formed or converted into multi-dimensional data as one dimensional, however, may be navigated through the multiple dimensions. For example, FIG. 6B shows an exemplary utilization of oblique projection on two dimensional data (rather than a physical object) to present media data in a one dimensional presentation. As further seen in FIG. 6B, structure 600 may be converted to a vertically-arranged hierarchical structure. In one embodiment, at least a portion of the items of column 611 (items 602-610) may form a first layer, such as layer 643.

Media offerings (or portions thereof) that are associated with a item may form a second layer specific to that item. For example, as discussed above in relation to FIG. 6A, data item 606 is associated with media offerings of row 642, therefore, in one embodiment, at least a portion of the media offerings of 642 may form a second layer (see layer 644) associated with item 606. Thus, in the depicted embodiment, structure 600 has been converted to a hierarchical structure in which layer 643 forms a "top" layer that is vertically-arranged above at least one subsequent layer (such as the media offerings in layer 644). In this regard, the uppermost layer of data may represent the plurality of data items. In certain embodiments, whether a visual display of the hierarchy is vertically and/or horizontally arranged and/or the relationship between the various layers (disposed adjacent to, overlay, partially overlay, expand out of, and/or in a 3D relationship) may be user selectable.

As shown in FIG. 6C, at least a portion of layer 643 may be visually displayed on a display device, such as device 658. In one embodiment, device 658 may be substantially similar to device 402. In this regard, any discussion and/or disclosure relating to device 402 and/or FIGS. 4A-4G may be optionally included in various embodiments of FIGS. 6A-6E. As seen in FIG. 6C, layer 643 may be presented as a selectable array of sequentially-arranged data (e.g., items of media content 602-610) of that layer 643, which may be aligned along a vertical axis of display 658. Yet in other embodiments, layer 643 may be aligned along a horizontal axis. In one implementation, layer 643 (a.k.a., level one information) may be vertically accessible as a single item, such that less than all of the level one information is simultaneously viewable on display 658. As an example, FIG. 6C shows a hierarchy of data of selectable level one information (e.g., media offerings 602-610) in which only a portion of media offerings 602-610 is shown as being on the screen of device 658. In the depiction shown in FIG. 6C, certain level one information 602-610 may not be displayed due to size restrictions. In one embodiment, however, a user may touch/swipe a region of display 658 corresponding to a command to scroll up/down the column.

As shown in FIG. 6D, further aspects of this disclosure relate to a hierarchy of data having multiple layers arranged in an expandable hierarchy of data, such as along one or more axis. For example, each of items 602-610 may represent discrete data of a first layer 643. As discussed in relation to FIG. 6B, each of the first layer data, however, may be associated with second layer data (e.g., chronologically ordered media offerings that are displayed in FIG. 6B). In response to the selection of the displayed item, such as item 606 a first layer 643 (or a portion thereof) may be expanded and a second layer, such as layer 644, may be displayed in regards to the selected first layer data. For example, as shown in FIG. 6D, first level data 606 may have been selected, and as a result, second layer data 644 (e.g., multiple second level data items 616, 626 and 636) may be displayed. Thus, in one embodiment, the first layer 644 (comprising data items 602-610) may be expanded along the vertical axis and second layer 644 of the expandable hierarchy of data is displayed. In one embodiment, media offerings 616, 626 and 636 may be chronologically-ordered. Similar to certain implementations of layer 643, layer 644 may be vertically accessible, such that at least a portion of the data of layer 644 may not be viewable at all times (see. e.g., FIG. 6E).

As shown by the illustrative embodiment of FIG. 6F and FIG. 6G, the user may provide a further selecting of data of the second layer 644. The third selection may variously create a third layer 652 of expandable hierarchy showing further data, e.g., descriptive content and/or actions associated with the selected offerings. A third layer 652 may be disposed adjacent to, overlay, partially overlay, expand out of, and/or in a 3D relationship to the second layer. In an exemplary embodiment, the third layer 652 expands substantially along the same or similar axis which in certain embodiments facilitates the user keeping context of his location within the data. In this example, the third layer data may be, for example, additional information, or options selectable by the user, such as: play, record, and/or send.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or sub combination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure. Further, any trademarks referenced herein, including but not limited to: "Disney", "ESPN," "ABC", "USA" "NBC", "CBS", "Yahoo", "Google", and "Amazon" is the property of the respective owner(s) and no ownership or affiliation of any marks are claimed.

I claim:

1. A method comprising:
outputting for display on a touchscreen, along a vertical axis of the touchscreen, a first hierarchical level of a hierarchy of data, wherein the first hierarchical level corresponds to a plurality of media items, and wherein the hierarchy of data comprises the first hierarchical level and a second hierarchical level that corresponds to a plurality of media offerings;
based on receiving first user input indicating a selection of a selected media item of the plurality of media items, expanding the first hierarchical level and outputting for display, along the vertical axis and within the second hierarchical level, a subset of the plurality of media offerings, wherein the subset of the plurality of media offerings is associated with the selected media item;
receiving, at a location on the touchscreen, a first vertical scrolling touch gesture;
based on the first hierarchical level being expanded and based on the location of the first vertical scrolling touch gesture being within the first hierarchical level and at one of the plurality of media items:
scrolling the first hierarchical level along the vertical axis; and
moving, during the scrolling, the second hierarchical level along the vertical axis in conjunction with the first hierarchical level; and
receiving, at the location on the touchscreen, a second vertical scrolling touch gesture;
based on the first hierarchical level being expanded and based on the location of the second vertical scrolling touch gesture being within the second hierarchical level and at one of the plurality of media offerings:
scrolling the second hierarchical level along the vertical axis; and
not scrolling the first hierarchical level along the vertical axis.

2. The method of claim 1, further comprising:
based on receiving second user input indicating a selection of a selected media offering of the plurality of media offerings, outputting for display, along the vertical axis and within a third hierarchical level of the hierarchy of data, descriptive content of the selected media offering.

3. The method of claim 2, further comprising:
outputting for display a selectable action for initiating playback of the selected media offering.

4. The method of claim 2, wherein the descriptive content within the third hierarchical level comprises a first top boundary and a first bottom boundary separated by a first vertical distance that is equal to or less than a second vertical distance between a second top boundary and a second bottom boundary of the selected media item.

5. The method of claim 2, further comprising:
based on receiving third user input, outputting for display a predefined quantity of the plurality of media offerings.

6. The method of claim 5, wherein the third user input is received prior to the first user input.

7. The method of claim 5, wherein the third user input is an indication specific to a single data item.

8. The method of claim 2, further comprising:
receiving third user input comprising an indication of descriptive content to be output for display based on receiving the second user input.

9. The method of claim 1, wherein the first hierarchical level comprises a substantially uniform horizontal width between two vertical boundaries that are parallel with the vertical axis, and wherein the second hierarchical level comprises a same horizontal width as the first hierarchical level.

10. The method of claim 1, wherein the second hierarchical level is time-based and the plurality of media offerings are arranged within the second hierarchical level in a chronological order.

11. The method of claim 1, wherein:
the plurality of media items comprise at least one of a broadcast network, a channel, a website, an online video source, an online audio source, an over-the-air (OTA) source, an item of media content, or a media content listing.

12. The method of claim 1, wherein the first vertical scrolling touch gesture is received at an indication of the selected media item within the first hierarchical level.

13. The method of claim 1, wherein the second vertical scrolling touch gesture is received at an indication of a media offering of the subset of the plurality of media offerings within the second hierarchical level.

14. The method of claim 1, wherein at least one of the first vertical scrolling touch gesture or the second vertical scrolling touch gesture is a vertical swipe touch gesture.

15. A method comprising:
outputting for display on a touchscreen, along a horizontal axis of the touchscreen, a first hierarchical level of a hierarchy of data, wherein the first hierarchical level corresponds to a plurality of media items, and wherein the hierarchy of data comprises the first hierarchical level and a second hierarchical level that corresponds to a plurality of media offerings;
based on receiving first user input indicating a selection of a selected media item of the plurality of media items, expanding the first hierarchical level and outputting for display, along the horizontal axis and within the second hierarchical level, a subset of the plurality of media offerings, wherein the subset of plurality of media offerings is associated with the selected media item;

receiving, at a location on the touchscreen, a first horizontal scrolling touch gesture;

based on the first hierarchical level being expanded and based on the location of the first horizontal scrolling touch gesture being within the first hierarchical level and at one of the plurality of media items:
   scrolling the first hierarchical level along the horizontal axis; and
   moving, during the scrolling, the second hierarchical level along the horizontal axis in conjunction with the first hierarchical level; and receiving, at the location on the touchscreen, a second horizontal scrolling touch gesture;

based on the first hierarchical level being expanded and based on determining that the location of the second horizontal scrolling touch gesture being within the second hierarchical level and at one of the plurality of media offerings:
   scrolling the second hierarchical level along the horizontal axis; and
   not scrolling the first hierarchical level along the horizontal axis.

16. The method of claim 15, further comprising:
based on receiving second user input indicating a selection of a selected media offering of the plurality of media offerings, outputting for display, along the horizontal axis and within a third hierarchical level of the hierarchy of data, descriptive content of the selected media offering.

17. The method of claim 16, further comprising:
outputting for display a selectable action for initiating playback of the selected media offering.

18. The method of claim 16, wherein the descriptive content within the third hierarchical level comprises a first left boundary and a first right boundary separated by a first horizontal distance that is equal to or less than a second horizontal distance between a second left boundary and a second right boundary of the selected media item.

19. The method of claim 16, further comprising:
based on receiving third user input, outputting for display a predefined quantity of the plurality of media offerings.

20. The method of claim 19, wherein the third user input is received prior to the first user input.

21. The method of claim 15, wherein the first hierarchical level comprises a substantially uniform vertical height between two horizontal boundaries that are parallel with the horizontal axis, and wherein the second hierarchical level comprises a same vertical height as the first hierarchical level.

22. A method comprising:
outputting for display on a touchscreen, along a vertical axis of the touchscreen, a hierarchy of data, wherein the hierarchy of data comprises a first hierarchical level that corresponds to a plurality of media items;

based on first user input comprising a selection of a selected media item of the plurality of media items, expanding the first hierarchical level and outputting for display, along the vertical axis, a second hierarchical level of the hierarchy of data, wherein the second hierarchical level is configured to vertically scroll along the vertical axis independently of the first hierarchical level;

based on receiving a first vertical scrolling touch gesture at a location on the touchscreen within the first hierarchical level and at one of the plurality of media items, and based on the first hierarchical level being expanded, outputting for display a portion of the first hierarchical level that previously fell outside of a viewable region of the touchscreen by:
   vertically scrolling the first hierarchical level; and
   vertically moving, during the scrolling, the second hierarchical level in conjunction with the first hierarchical level; and based on receiving a second vertical scrolling touch gesture at the location on the touchscreen within the second hierarchical level, and based on the first hierarchical level being expanded, outputting for display a portion of the second hierarchical level that previously fell outside of the viewable region of the touchscreen by vertically scrolling the second hierarchical level without vertically scrolling the first hierarchical level.

23. The method of claim 22, further comprising:
based on second user input indicating a selection of a selected media offering within the second hierarchical level, outputting for display, along the vertical axis and within a third hierarchical level of the hierarchy of data, descriptive content of the selected media offering.

24. The method of claim 23, further comprising:
outputting for display a selectable action for initiating playback of the selected media offering.

25. A method comprising:
outputting for display on a touchscreen, along a vertical axis of the touchscreen and as a single column a first hierarchical level of a hierarchy of data, wherein the first hierarchical level corresponds to a content source, wherein the hierarchy of data comprises the first hierarchical level and a second hierarchical level that corresponds to at least one content asset associated with the content source, and wherein the first hierarchical level indicates the content source and the second hierarchical level indicates the at least one content asset;

based on a user input selection of the first hierarchical level, outputting for display and along the vertical axis, the second hierarchical level by expanding the first hierarchical level;

based on receiving a first vertical scrolling touch gesture at a location on the touchscreen within the first hierarchical level and at the content source, and based on the first hierarchical level being expanded:
   scrolling the first hierarchical level along the vertical axis; and
   moving, during the scrolling, the second hierarchical level along the vertical axis in conjunction with the first hierarchical level; and based on receiving a second vertical scrolling touch gesture at the location on the touchscreen within the second hierarchical level and at the at least one content asset, and based on the first hierarchical level being expanded:
   scrolling the second hierarchical level along the vertical axis; and
   not scrolling the first hierarchical level along the vertical axis.

26. The method of claim 25, wherein:
the content source comprises at least one of a broadcast network, a channel, a website, an online video source, an online audio source, or an over-the-air (OTA) source.

27. The method of claim 25, wherein:
the content source provides the at least one content asset.

* * * * *

UNITED STATES PATENT AND TRADEMARK OFFICE
CERTIFICATE OF CORRECTION

PATENT NO. : 11,847,300 B2
APPLICATION NO. : 13/417492
DATED : December 19, 2023
INVENTOR(S) : Bryan Yurasits Page 1 of 1

It is certified that error appears in the above-identified patent and that said Letters Patent is hereby corrected as shown below:

In the Specification

Column 9, Line 46:
Delete "306" and insert --208--

Column 11, Line 22:
Delete "406" and insert --420--

Column 11, Line 56:
Delete "420." and insert --422.--

In the Claims

Column 20, Line 33:
In Claim 25, after "column", insert --,--

Signed and Sealed this
Fourteenth Day of January, 2025

Derrick Brent
*Acting Director of the United States Patent and Trademark Office*